United States Patent
Herrmann

(10) Patent No.: US 7,590,684 B2
(45) Date of Patent: Sep. 15, 2009

(54) SYSTEM PROVIDING METHODOLOGY FOR ACCESS CONTROL WITH COOPERATIVE ENFORCEMENT

(75) Inventor: Conrad K. Herrmann, Oakland, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 1254 days.

(21) Appl. No.: 10/708,660

(22) Filed: Mar. 17, 2004

(65) Prior Publication Data
US 2004/0167984 A1 Aug. 26, 2004

Related U.S. Application Data

(63) Continuation-in-part of application No. 10/249,073, filed on Mar. 13, 2003, and a continuation-in-part of application No. 09/944,057, filed on Aug. 30, 2001.

(60) Provisional application No. 60/481,679, filed on Nov. 20, 2003, provisional application No. 60/303,653, filed on Jul. 6, 2001, provisional application No. 60/430,458, filed on Dec. 2, 2002.

(51) Int. Cl.
G06F 15/16 (2006.01)
(52) U.S. Cl. .................. 709/203; 709/217; 709/219
(58) Field of Classification Search .................. 709/203, 709/217, 219; 713/150, 182, 188; 726/6, 726/10
See application file for complete search history.

(56) References Cited

U.S. PATENT DOCUMENTS

| | | | |
|---|---|---|---|
| 4,914,586 A | 4/1990 | Swinehart et al. | 707/101 |
| 5,172,227 A | 12/1992 | Tsai et al. | 358/133 |
| 5,412,427 A | 5/1995 | Rabbani et al. | 348/394 |
| 5,475,817 A | 12/1995 | Waldo et al. | 709/316 |
| 5,586,260 A | 12/1996 | Hu | 713/201 |
| 5,623,601 A | 4/1997 | Vu | 713/201 |
| 5,652,621 A | 7/1997 | Adams, Jr. et al. | 348/272 |
| 5,682,152 A | 10/1997 | Wang et al. | 341/50 |
| 5,745,701 A | 4/1998 | Nguyen-Thai et al. | 709/249 |
| 5,754,227 A | 5/1998 | Fukuoka | 348/232 |
| 5,764,887 A | 6/1998 | Kells et al. | 713/200 |
| 5,798,794 A | 8/1998 | Takahashi | 348/398 |
| 5,815,574 A | 9/1998 | Fortinsky | 713/153 |

(Continued)

OTHER PUBLICATIONS

Linn, J., RCF2743: Generic Security Service Application Program Interface, RSA Laboratories, Jan. 2000.

(Continued)

Primary Examiner—Frantz B Jean
(74) Attorney, Agent, or Firm—John A. Smart

(57) ABSTRACT

A system providing methodology for access control with cooperative enforcement is described. In one embodiment, for example, a method is described for authorizing a client to access a service based on compliance with a policy required for access to the service, the method comprises steps of: specifying a policy required for access to the service; detecting a request for access to the service from a client; attempting authentication of the client based on credentials presented by the client; if the client is authenticated based on the credentials, determining whether the client is in compliance with the policy based, at least in part, on attributes of the client; and if the client is determined to be in compliance with the policy, providing access to the service.

68 Claims, 11 Drawing Sheets

U.S. PATENT DOCUMENTS

| | | | | |
|---|---|---|---|---|
| 5,818,525 | A | 10/1998 | Elabd | 348/268 |
| 5,828,833 | A | 10/1998 | Belville et al. | 713/201 |
| 5,832,211 | A | 11/1998 | Blakley et al. | 713/202 |
| 5,838,903 | A | 11/1998 | Blakely et al. | 713/202 |
| 5,848,193 | A | 12/1998 | Garcia | 382/232 |
| 5,857,191 | A | 1/1999 | Blackwell et al. | 707/10 |
| 5,864,665 | A | 1/1999 | Tran | 713/201 |
| 5,875,296 | A | 2/1999 | Shi et al. | 713/202 |
| 5,881,230 | A | 3/1999 | Christensen et al. | 709/203 |
| 5,907,610 | A | 5/1999 | Onweller | 379/242 |
| 5,913,088 | A | 6/1999 | Moghadam et al. | 396/311 |
| 5,917,542 | A | 6/1999 | Moghadam et al. | 348/207 |
| 5,926,105 | A | 7/1999 | Wakamatsu | 370/401 |
| 5,968,176 | A | 10/1999 | Nessett et al. | 713/201 |
| 5,983,350 | A | 11/1999 | Minear et al. | 713/201 |
| 5,987,611 | A | 11/1999 | Freund | 713/201 |
| 5,996,077 | A | 11/1999 | Williams | 713/201 |
| 6,008,847 | A | 12/1999 | Bauchspies | 348/391 |
| 6,028,807 | A | 2/2000 | Awsienko | 365/230.02 |
| 6,064,437 | A | 5/2000 | Phan et al. | 348/446 |
| 6,091,777 | A | 7/2000 | Guetz et al. | 375/240 |
| 6,098,173 | A | 8/2000 | Elgressy et al. | 713/201 |
| 6,125,201 | A | 9/2000 | Zador | 382/166 |
| 6,134,327 | A | 10/2000 | Van Oorschot | 380/30 |
| 6,154,493 | A | 11/2000 | Acharya et al. | 375/240.19 |
| 6,158,007 | A * | 12/2000 | Moreh et al. | 726/1 |
| 6,158,010 | A | 12/2000 | Moriconi et al. | 713/201 |
| 6,167,438 | A | 12/2000 | Yates et al. | 709/216 |
| 6,212,558 | B1 | 4/2001 | Antur et al. | 709/221 |
| 6,243,420 | B1 | 6/2001 | Michell et al. | 375/240.18 |
| 6,247,062 | B1 | 6/2001 | Sarkar | 709/245 |
| 6,249,820 | B1 | 6/2001 | Dobbins et al. | 709/238 |
| 6,269,099 | B1 | 7/2001 | Borella et al. | 370/389 |
| 6,304,973 | B1 | 10/2001 | Williams | 713/201 |
| 6,321,334 | B1 | 11/2001 | Jerger et al. | 713/200 |
| 6,330,562 | B1 | 12/2001 | Boden et al. | 707/10 |
| 6,345,361 | B1 | 2/2002 | Jerger et al. | 713/200 |
| 6,351,816 | B1 | 2/2002 | Mueller et al. | 713/201 |
| 6,356,929 | B1 | 3/2002 | Gall et al. | 709/201 |
| 6,393,474 | B1 | 5/2002 | Eichert et al. | 709/223 |
| 6,393,484 | B1 | 5/2002 | Massarani | 709/227 |
| 6,438,612 | B1 | 8/2002 | Ylonen et al. | 709/249 |
| 6,449,723 | B1 | 9/2002 | Elgressy et al. | 713/201 |
| 6,453,419 | B1 | 9/2002 | Flint et al. | 713/201 |
| 6,466,932 | B1 | 10/2002 | Dennis et al. | 707/3 |
| 6,473,800 | B1 | 10/2002 | Jerger et al. | 709/226 |
| 6,480,962 | B1 | 11/2002 | Touboul | 713/200 |
| 6,484,261 | B1 | 11/2002 | Wiegel | 713/201 |
| 6,490,679 | B1 | 12/2002 | Tumblin et al. | 713/155 |
| 6,499,110 | B1 | 12/2002 | Moses et al. | 713/201 |
| 6,510,513 | B1 | 1/2003 | Danieli | 713/156 |
| 6,526,513 | B1 | 2/2003 | Shrader et al. | 713/200 |
| 6,539,483 | B1 | 3/2003 | Harrison et al. | 713/201 |
| 6,553,498 | B1 | 4/2003 | Elgressy et al. | 713/201 |
| 6,598,057 | B1 | 7/2003 | Synnestvedt et al. | 370/352 |
| 6,606,708 | B1 | 8/2003 | Devine et al. | 713/201 |
| 6,643,776 | B1 | 11/2003 | Boden et al. | 709/224 |
| 7,487,509 | B2 * | 2/2009 | Hugly et al. | 719/310 |
| 2002/0010679 | A1 * | 1/2002 | Felsher | 705/51 |
| 2004/0103310 | A1 * | 5/2004 | Sobel et al. | 713/201 |
| 2005/0251856 | A1 * | 11/2005 | Araujo et al. | 726/12 |
| 2008/0115200 | A1 * | 5/2008 | Olson et al. | 726/6 |

OTHER PUBLICATIONS

Blaze, M. et al., RCF2704: The KeyNote Trust Management System Version 2, ATT Labs Research, Sep. 1999.
Dierks, T. et al., RCF2246: The TLS Protocol, Certicom, Jan. 1999.
Blunk, L. et al., RCF2284: PPP Extensible Authentication Protocol (EAP), Merit Network, Inc., Mar. 1998.
Kabat, J. et al., RCF2853: Generic Security Service API Version 2: Java Bindings, Sun Microsystems, Inc., Jun. 2000.
Rigney, C. et al., RCF2865: Remote Authentication Dial In User Service (Radius), The Internet Society, Jun. 2000.
Rivest, R., RFC 1321: The MD5 Message-Digest Algorithm, MIT Laboratory for Computer Science, Apr. 1992.
Socolofsky, T. et al., RCF1180: A TCP/IP Tutorial, Spider Systems Limited, Jan. 1991.
Information Sciences Institute, RFC793: Transmission Control Protocol, Information Sciences Institute, Sep. 1981.
Postel, J., RFC768, User Datagram Protocol, ISI, Aug. 20, 1980.
Fraser, B., RCF2196: Site Security Handbook, SEI/CMU, Sep. 1997.
Linn, J., RCF1964: The Kerberoe Version 5 GSS API Mechanism, OpenVision Technologies, Jun. 1996.
Kohl, J. et al., RCF1510: The Kerberos Network Authentication Service (V5), Digital Equipment Corporation, Sep. 1993.

* cited by examiner

SYSTEM PROVIDING METHODOLOGY FOR ACCESS CONTROL WITH COOPERATIVE ENFORCEMENT

CROSS REFERENCE TO RELATED APPLICATIONS

The present application is related to and claims the benefit of priority of the following commonly-owned, presently-pending provisional application(s): application Ser. No. 60/481,679, filed Nov. 20, 2003, entitled "System Providing Methodology for Access Control with Cooperative Enforcement", of which the present application is a non-provisional application thereof. The present application is related to and claims the benefit of priority of the following commonly-owned, presently-pending nonprovisional application(s): application Ser. No. 09/944,057, filed Aug. 30, 2001, entitled "System Providing Internet Access Management with Router-based Policy Enforcement", of which the present application is a Continuation-in-part application thereof; application Ser. No. 10/249,073, filed Mar. 13, 2003, entitled "System and Methodology for Policy Enforcement", of which the present application is a Continuation-in-part application thereof. The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt created: Nov. 20, 2003, 8:37 am, size: 67.9 KB; Object ID: File No. 1; Object Contents: Source Code.

BACKGROUND OF INVENTION

1. Field of the Invention

The present invention relates generally to systems and methods for maintaining security of computer systems connected to one or more networks (e.g., Local Area Networks or Wide Area Networks) and, more particularly, to a system providing methodology for access control with cooperative enforcement.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or LANs. In both cases, maintaining security and controlling what information a computer user could access was relatively simple because the overall computing environment was limited and clearly defined.

With the ever-increasing popularity of the Internet, however, more and more computers are connected to larger networks. Providing access to vast stores of information, the Internet is typically accessed by users through Web "browsers" (e.g., Microsoft® Internet Explorer or Netscape Navigator) or other Internet applications. Browsers and other Internet applications include the ability to access a URL (Universal Resource Locator) or "Web" site. In the last several years, the Internet has become pervasive and is used not only by corporations, but also by a large number of small businesses and individual users for a wide range of purposes. Many applications are now Web-enabled, providing services to remote users through various types of networks.

As more and more computers are now connected to other local and remote computers (e.g., via the Internet), a whole new set of challenges face system administrators and individual users alike: these previously closed computing environments are now open to a worldwide network of computer systems. A particular set of challenges involves attacks by perpetrators (hackers) capable of damaging the local computer systems, misusing those systems, and/or stealing proprietary data and programs. Another challenge is in maintaining and securing applications (services) that are made available to remote users.

A service is a unit of program logic (e.g., an application or process) which runs on a remote computer or in the background on a local computer and provides data to and/or performs tasks for other programs (e.g., application programs). The work performed or offered by a service may include simply serving simple requests for data to be sent or stored or it may involve more complex tasks. A well known example of a service that is currently in wide use is the domain name service (DNS). The domain name service resolves a URL name to an IP address (and vice versa). Another example of a service is an FTP (file transfer protocol) service for transfer of files. Historically, using a service has involved calling a remote server to obtain data and/or work from the remote server. However, as computers have become more powerful, a typical computer environment also includes services that are available locally.

Currently, most computer services (i.e., server programs in a client-server scheme) grant access to remote computers based on user authentication. In multiprocessing systems, they do the same thing for other processes on the same computer. For the purposes of the following discussion, both of these situations will be referred to as "client/server" computing, where the "client" is a user/program attempting to access a "server" to use a particular service (e.g., an application or service on a remote computer).

Once a client (e.g., user) is authenticated to have access, these services typically assign access privileges to each user or group of users. Depending on the function of the program, the set of access privileges can vary. For file system service programs (e.g., Netbios, SAMBA, and other file sharing systems), access rights include the ability to read, write, execute files, and create or delete files in directories. For Web servers, access rights include the ability to execute specific access verbs (e.g., GET, POST, etc.) to specific URLs. For a sales transaction system, access rights may include the ability to register a sale, to perform a refund, to report the day's tally, and so on.

Access privilege to a given resource is often specified as an access control list (ACL) associated with a specific resource by the operating system or a service application. An ACL names users and groups, and the list of access rights each is assigned. ACLs also list the access rights (if any) of users who are not members of any of the listed groups.

Although current user authentication systems are widely used to control access to computer systems and networks, several problems remain. One problem that is not addressed by current user authentication systems is ensuring that all devices that connect to a service or resource comply with applicable security policies in order to protect these services and resources. For example, if a remote user that is connected to a bank for on-line banking does not apply and enforce the bank's required security policies, a hacker could gain unauthorized access to the bank's systems through the remote user's unsecured system. Although a secure connection may be established between the bank and the user, and the user may be authenticated for access to the bank's systems, if the user's system is vulnerable to any security breaches the security of the overall environment may be jeopardized.

A related problem is that if a client device is infected with a virus or worm, it may infect other machines to which it is connected. For example, an infected computer that is connected to a particular network (e.g., a corporate LAN) may be infected with a virus that intentionally tries to spread itself to other machines. One machine that is not running the correct anti-virus engine or is not equipped with current virus signature definition files may jeopardize the security of many other machines. Ensuring that connected client devices are running current anti-virus programs is particularly important, as virus suppression methods are very time sensitive and failure to use current anti-virus programs may result in the introduction of a virus that can cause significant damage.

A solution is required that validates access and assigns access privileges to clients based on credentials in addition to user identity. The solution should ensure that client devices connecting to services or other resources are using appropriate security mechanisms and are otherwise in compliance with required security policies to maintain the overall security of the environment. In particular, the solution should ensure that a client device requesting access to a particular service has appropriate security mechanisms and virus suppression measures installed and operational before it is permitted to access the service. The present invention provides a solution for these and other needs.

SUMMARY OF INVENTION

A system providing methodology for access control with cooperative enforcement is described. In one embodiment, for example, a method of the present invention is described for authorizing a client to access a service based on compliance with a policy required for access to the service, the method comprises steps of: specifying a policy required for access to the service; detecting a request for access to the service from a client; attempting authentication of the client based on credentials presented by the client; if the client is authenticated based on the credentials, determining whether the client is in compliance with the policy based, at least in part, on attributes of the client; and if the client is determined to be in compliance with the policy, providing access to the service.

In another embodiment, for example, a system of the present invention is described for authenticating and assigning access privileges to a client device for access to a service, the system comprises: a policy specifying access privileges to be assigned to a client device based on attributes of the client device; a primary authentication module for receiving a request from a client device for access to the service and determining whether to authenticate the client device for access to the service; and a supplemental authentication module for examining attributes of a client device authenticated by the primary authentication module and assigning access privileges to the client device based on the policy.

In yet another embodiment, for example, a method of the present invention is described for assigning privileges to a client to use a service based on an access policy, the method comprises steps of: specifying an access policy for assigning privileges to a client to use the service based on attributes of the client; detecting a request for use of the service from a client; attempting authentication of the client based on user identity information provided by the client; if the client is authenticated based on user identity, collecting attribute information from the client; and assigning privileges to the client to use the service based on the collected attribute information and the access policy.

In another embodiment, for example, in a system comprising a client computer connecting to a service through a network, a method of the present invention is described for regulating access to the service based on a specified access policy, the method comprises steps of: transmitting a challenge from the service to the client computer connecting to the service for determining whether the client computer is in compliance with the specified access policy, wherein the access policy includes attributes of the client device that are acceptable for permitting access to the service; transmitting a response from the client computer back to the service, for responding to the challenge issued by the service; and blocking access to the service by the client computer if the client computer does not respond appropriately to the challenge issued by the service.

DETAILED DESCRIPTION

Glossary

Figure 1:
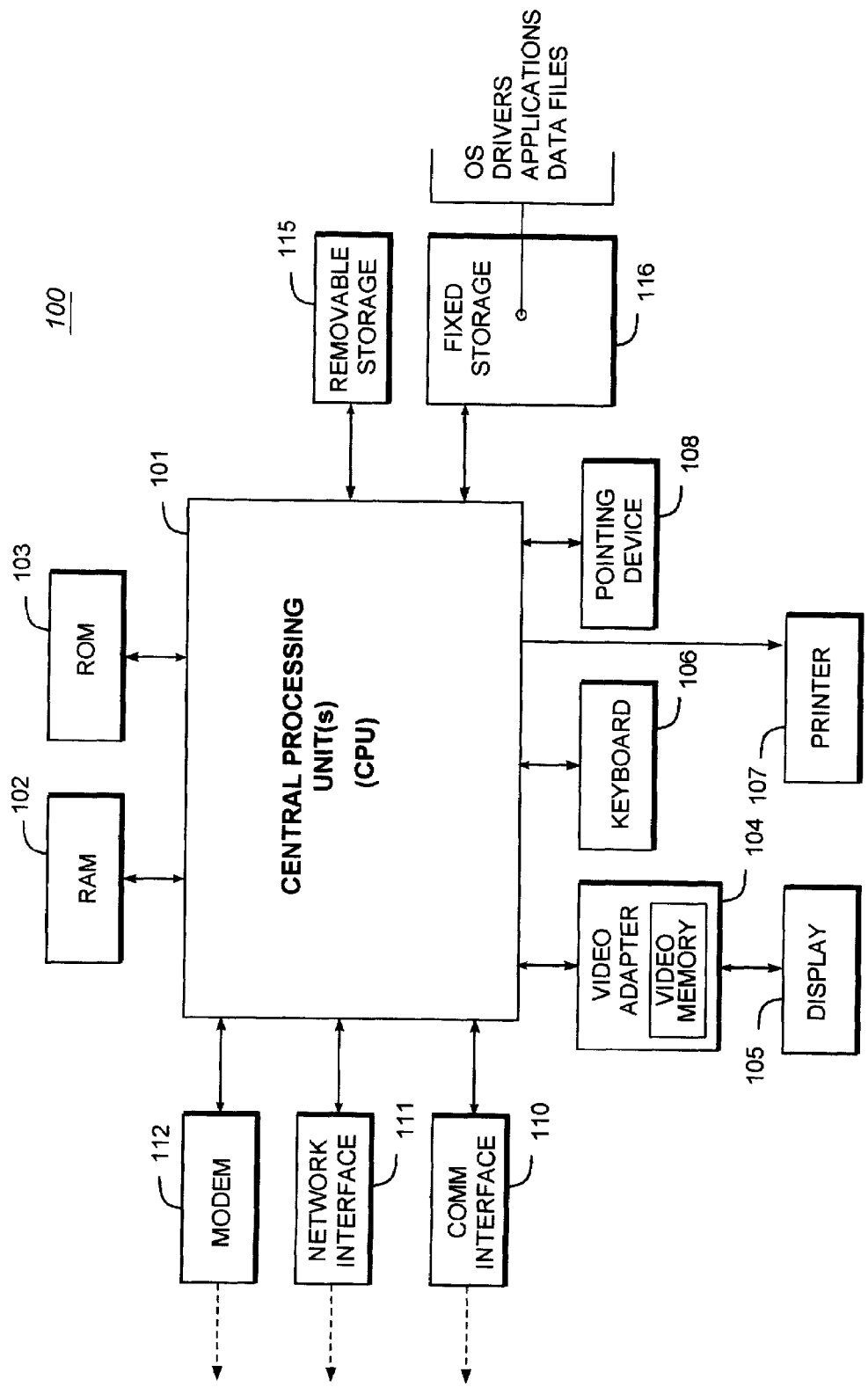
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN), such as the Internet, in order to provide security to the machine.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

GSS-API: The Generic Security Service Application Program Interface (GSS-API) provides application programmers uniform access to security services using a variety of underlying cryptographic mechanisms. The GSS-API allows a caller application to authenticate a principal identity, to delegate rights to a peer, and to apply security services such as confidentiality and integrity on a per-message basis. Examples of security mechanisms defined for GSS-API include "The Simple Public-Key GSS-API Mechanism" and "The Kerberos Version 5 GSS-API Mechanism". For further information regarding GSS-API, see e.g., "RFC 2743: Generic Security Service Application Program Interface Version 2, Update 1", available from the Internet Engineering Task Force (IETF), the disclosure of which is hereby incorporated by reference. A copy of RFC 2743 is available via the Internet (e.g., currently at www.ietf.org/rfc/rfc2743.txt). See also e.g., "RFC 2853: Generic Security Service API Version 2: Java Bindings", available from the IETF, the disclosure of which is hereby incorporated by reference. A copy of RFC 2853 is available via the Internet (e.g., currently at www.ietf.org/rfc/rfc2853.txt).

Kerberos: Kerberos is an authentication protocol for verifying the identities of principals (e.g., a workstation user or a network server) on an open network. The Kerberos authentication process generally involves the following steps. A client sends a request to the authentication server (AS) requesting "credentials" for a given server. The authentication server responds with these credentials, encrypted to the client's key. The credentials consist of: 1) a "ticket" for the server; and 2) a temporary encryption key (often called a "session key"). The client transmits the ticket (which contains the client's identity and a copy of the session key, all encrypted to the server's key) to a server (e.g., an application server). The session key (now shared by the client and the server) is used to authenticate the client, and may optionally be used to authenticate the server. It may also be used to encrypt further communication between the two parties or to exchange a separate sub-session key to be used to encrypt further communication. A typical Kerberos implementation consists of one or more authentication server(s) running on physically secure hosts. The authentication server(s) maintain a database of principals (i.e., users and servers) and their secret keys. Code libraries provide encryption and implement the Kerberos protocol. In order to add authentication to its transactions, a typical network application adds one or two calls to the Kerberos library, which results in the transmission of the necessary messages to achieve authentication. For further description of Kerberos authentication, see e.g., "RFC 1510-The Kerberos Network Authentication Service (V5)", available from the IETF, the disclosure of which is hereby incorporated by reference. A copy of RFC 1510 is available via the Internet (e.g., currently at www.ietf.org/rfc/rfc1510.txt). Also see e.g., "RFC 1964—The Kerberos Version 5 GSS-API Mechanism", available from the IETF, the disclosure of which is hereby incorporated by reference. A copy of RFC 1964 is available via the Internet (e.g., currently at www.ietf.org/rfc/rfc1964.txt).

MD5: MD5 is a message-digest algorithm which takes as input a message of arbitrary length and produces as output a 128-bit "fingerprint" or "message digest" of the input. The MD5 algorithm is used primarily in digital signature applications, where a large file must be "compressed" in a secure manner before being encrypted with a private (secret) key under a public-key cryptosystem. Further description of MD5 is available in "RFC 1321: The MD5 Message-Digest Algorithm", (April 1992), the disclosure of which is hereby incorporated by reference. A copy of RFC 1321 is available via the Internet (e.g., currently at www.ietf.org/rfc/rfc1321.txt).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

PAM: PAM stands for Pluggable Authentication Modules which can be used to assign specific authentication methods to specific services in an environment running Linux, UNIX, and/or Solaris operating systems. With the Pluggable Authentication Module (PAM) framework, multiple authentication technologies can be added without changing any of the login services, thereby preserving existing system environments. PAM modules can be used to integrate login services with different authentication technologies, such as RSA, DCE, Kerberos, S/Key, and smart card based authentication systems. Thus, Pluggable Authentication Modules enable networked machines to exist in a heterogeneous environment, where multiple security mechanisms are in place. For further description of PAM modules, see e.g., Samar, V. et al., "Making Login Services Independent of Authentication Technologies", available from SunSoft, Inc., the disclosure of which is hereby incorporated by reference. A copy of this white paper is available via the Internet (e.g., currently at wwws.sun.com/software/solaris/pam/pam.external.pdf).

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Further information on security policies is available in "RFC 2196: Site Security Handbook, (September 1997)", the disclosure of which is hereby incorporated by reference. A copy of RFC 2196 is available from the IETF via the Internet (e.g., currently at www.ietf.org/rfc/rfc2196.txt). For additional information, see also, e.g., "RFC 2704: The KeyNote Trust Management System Version 2", the disclosure of which is hereby incorporated by reference. A copy of RFC 2704 is available from the IETF via the Internet (e.g., currently at www.ietf.org/rfc/rfc2704.txt). In this document, "security policy" or "policy" refers to a set of security policies and rules employed by an individual or by a corporation, government entity, or any other organization operating a network or other computing resources.

Service: Service refers to work performed or offered by a unit of program logic (e.g., a program or process). A service is an abstract resource that represents a capability of performing tasks that form a coherent functionality from the point of view of providers entities and requester entities. To be used, a service must be realized by a concrete provider entity, which is usually referred to as the "provider" or "server". The service performs tasks for another program or process which is typically referred to as the "requester" or "client". The tasks that are performed may include serving simple requests for data to be sent or stored or may include more complex work. Examples of services that perform tasks for other programs include domain name services and Web services (defined below).

SSL: SSL is an abbreviation for Secure Sockets Layer, a protocol developed by Netscape for transmitting private documents over the Internet. SSL works by using a public key to encrypt data that is transferred over the SSL connection. Both Netscape Navigator and Microsoft Internet Explorer support SSL, and many Web sites use the protocol to obtain confidential user information, such as credit card numbers. SSL creates a secure connection between a client and a server, over which data can be sent securely. For further information, see e.g., "The SSL Protocol, version 3.0", (Nov. 18, 1996), from the IETF, the disclosure of which is hereby incorporated by reference. See also, e.g., "RFC 2246: The TLS Protocol, version 1.0", available from the IETF. A copy of RFC 2246 is available via the Internet (e.g., currently at www.itef.org/rfc/rfc2246.txt).

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial," the disclosure of which is hereby incorporated by reference. A copy of RFC 1180 is available via the Internet (e.g., currently at www.ietf.org/rfc/rfc1180.txt).

TNT: The Trust Negotiation in TLS (TNT) protocol is an extension to the TLS handshake protocol that incorporates trust negotiation into TLS to provide advanced client/server authentication in TLS. Many business transactions on the Internet occur between "strangers", that is, between entities with no prior relationship and no common security domain. Traditional security approaches based on identity or capabilities do not solve the problem of establishing trust between strangers. One new approach to mutual trust establishment is trust negotiation, the bilateral exchange of digital credentials to establish trust gradually. The TNT protocol provides confidential trust negotiation, verification of private keys during trust negotiation, and a single trust negotiation protocol supporting interoperable trust negotiation strategies. For further description of TNT, see e.g., Hess, A. et al., "Advanced Client/Server Authentication in TLS", in Proceedings of Network and Distributed System Security Symposium, San Diego, Calif., February 2002, the disclosure of which is hereby incorporated by reference.

UDP: UDP stands for User Datagram Protocol, a connection-less protocol that, like TCP, runs on top of IP networks. Unlike TCP/IP, UDP/IP provides very few error recovery services, offering instead a direct way to send and receive datagrams over an IP network. UDP is used primarily for broadcasting messages over a network. For additional information on UDP, see RFC 768, "User Datagram Protocol", the disclosure of which is hereby incorporated by reference. A copy of RFC 768 is available via the Internet (e.g., currently at www.ietf.org/rfc/rfc768.txt).

Web Service: A Web service is a software program or system designed to support interoperable machine-to-machine interaction over a network. A Web service has an interface described in a machine-processable format (e.g., using Web Services Description Language (WSDL)). Other programs and systems interact with the Web service in a manner prescribed by its description (e.g., using SOAP-messages, typically conveyed using HTTP with an XML serialization in conjunction with other Web-related standards). A familiar example of an externalized Web service is a weather portlet that one can integrate into a Web browser. Web services can also be used to encapsulate information and operations. Web services are becoming widely used for enterprise information exchange and as resources for information.

XML: XML stands for Extensible Markup Language, a specification developed by the World Wide Web Consortium (W3C). XML is a pared-down version of the Standard Generalized Markup Language (SGML) which is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/2000/REC-xml-20001006).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
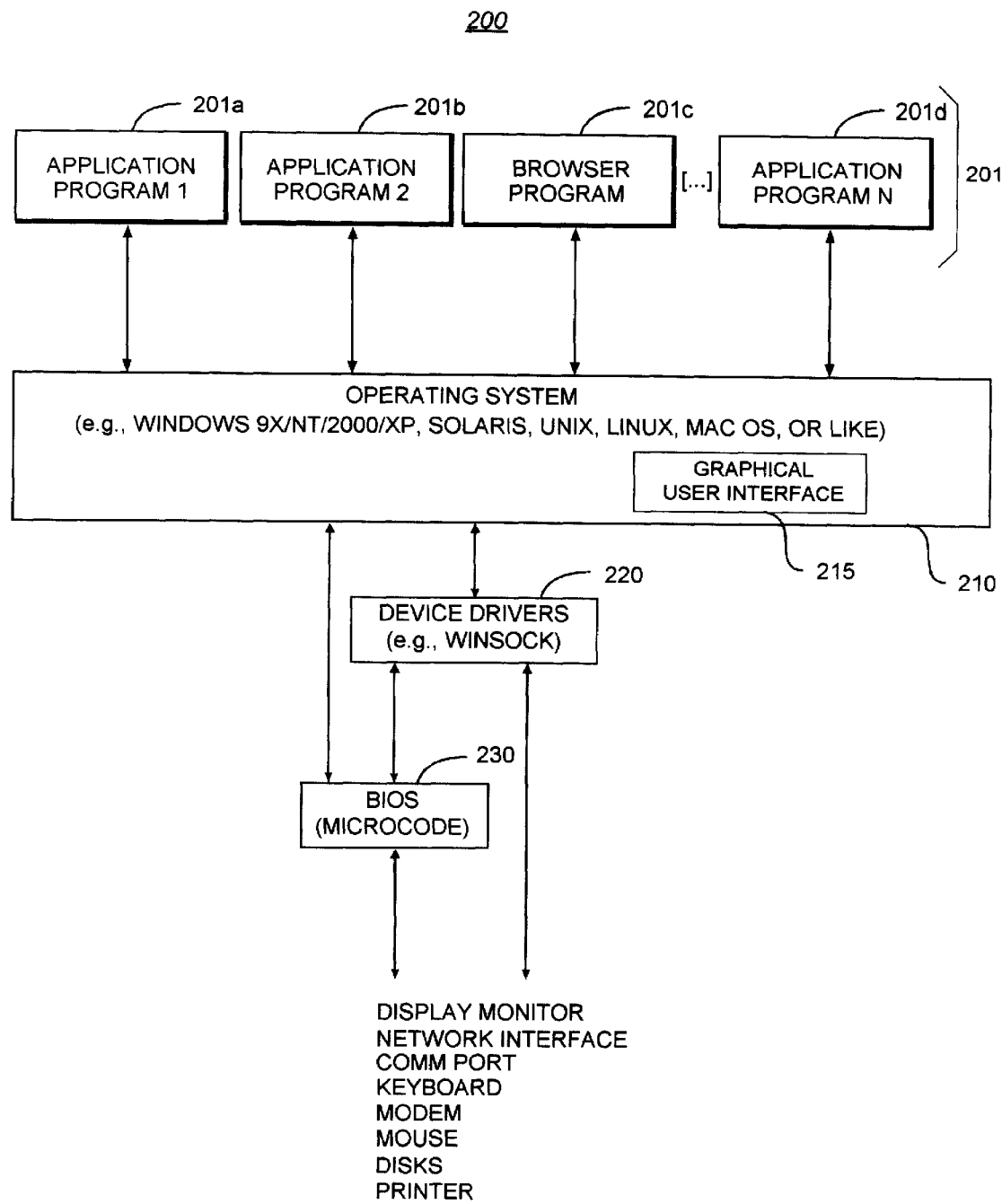
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file in-put and output (I/O), and device I/O. One or more application programs, such as client application software or "programs" 201 (e.g., 201a, 201b,

201*c*, 201*d*) may be "loaded" (i.e., transferred from fixed storage 116 into memory 102) for execution by the system 100. The applications or other software intended for use on the computer system 100 may also be stored as a set of down-loadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists one or more "servers" (e.g., Web servers) that communicate with one or more "clients" (e.g., desktop computers). In multiprocessing systems, a first or "client" process may also obtain services from other processes on the same computer. For the purposes of the following discussion, this situation is also referred to as "client/server" computing, where the "client" is a program/process attempting to access a service provided by another process. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

The present invention comprises a system providing methodology for validating access and assigning access privileges to clients based on credentials in addition to user identity. Many services currently grant access privileges to clients by means of an access policy, which is based on client (user) identity only, or on group membership(s) of the user. The present invention provides for the access policy to grant privileges based on additional credentials. These additional credentials which are considered may, for example, include one or more of the following: security relevant attributes of the client device; location of the user/client device; and/or type of client device. The system may also be configured to evaluate various other attributes of a client device that may be of interest (e.g., whether anti-virus measures and/or file integrity policies are in effect at the client device).

The approach of the present invention is to implement an authentication methodology in which user identity is established and then additional attributes (e.g., security enforcement attributes) are provided by the client (and checked for authenticity if possible) for determining whether to authenticate a client for access to services (e.g., services provided by a remote server computer). On the basis of the user identity, access may be granted or denied, and if it is granted, access privileges appropriate to the user, his or her group, and/or his or her role can be granted. On the basis of the additional security-relevant attributes of the client device (e.g., a personal computer or laptop computer), its location, its type, or the like, access privileges may be further restricted to ensure that unsecured clients (or clients in locations that are not secure) can have only limited access to certain services, resources, and/or remote applications.

The system and methodology of the present invention can be used, for example, to verify that the client attempting to access and use a service is running appropriate security software which is enforcing a required client security policy. The client security software and/or security policy can be identified by checksum, policy distinguished name, author/publisher, and/or by key policy characteristics such as a "firewall security level" that is in effect on the client device. These attributes can then be checked and evaluated either at the client device or at another device (e.g., at a server to which the client is requesting access or a separate security evaluation service). Access to resources requested by the client may be granted or denied, and/or access privileges may be established based on this evaluation.

The solution may also be used to verify a number of other attributes of the client device that may be of interest. For instance, the system may check to ensure that required virus suppression measures are in force on a client device. The system may, for example, check to determine that an anti-virus policy is in force which includes use of a particular anti-virus engine version (e.g., from a particular engine publisher), a particular data file version, and/or a particular data file identified by publication date.

There are a number of other examples of attributes that may be checked using the system and methodology of the present invention. For instance, the system may verify that a particular file integrity policy (e.g., TripWire) is in force on the client. Additional system check rules may include verifying that there is a process running on the computer with a specific name, or version, or MD5 checksum value. As another example, a check may be made for a particular file on the client computer that has a specific file path and file name, a particular MD5 checksum value, and/or a date within (or outside) a specific range. The system may also verify whether there is a registry entry on the client computer with a value that is (or is not) within an allowed set of values. These are only some of the examples, and a number of other checks may also be made using the methodology of the present invention, as desired.

The approach of the present invention initially provides for user identity to be collected and evaluated according to means similar to that of other authentication protocols. However, instead of only evaluating user identity before permitting access to services or resources, additional attributes (e.g., security attributes of the client device) are also evaluated through a supplemental (or secondary) authentication process before providing the client with access to particular services and/or resources. These additional attributes can be validated in a number of different ways, including (but not limited to) using a Secure Socket Layer (SSL) certificate exchange, an IPsec certificate exchange, a trust-establishment certificate exchange, or the like. Additional attributes can also be validated through out-of-band communications via a separate security evaluation service. When provided via a separate security evaluation service, the application server (i.e., the server in the client-server scheme) typically consults the separate security evaluation service for the result of a separate security evaluation that was previously made by the service (e.g., an evaluation made at the time of logon confirmation).

In the presently preferred embodiment, the system and methodology of the present invention is utilized for determining whether a client may have access to particular services, resources, and/or remote applications. The system can also establish the access privileges that are provided to the client based on characteristics of the client (e.g., the security enforcement attributes presented by the client). A security policy (or access policy) is maintained based on the characteristics or attributes (e.g., security enforcement attributes) that are required or desired as a condition for accessing an application or service (or certain of its features, resources, or privileges). The access policy may, for instance, specify that clients which have specific security enforcement attributes will be given particular access privileges. The system of the present invention makes a decision about the access privileges to be provided to a client, based on whether the client's attributes (e.g., security enforcement attributes) match the required attributes specified by the security policy (access policy). Security enforcement attributes are only one example of attributes that can be evaluated using the system and methodology of the present invention. A number of other attributes and/or conditions may also be evaluated as previously described.

Alternatively, the system may consult with a third party authentication, authorization, and accounting ("AAA") service to determine the level of access allowed the client. In this event, the AAA service typically returns a list of privileges or group memberships that describe the appropriate privileges the client should be granted. For example, a file server normally deals with the following privileges: "read", "write", "execute", "create", and "delete". In a network system where there are defined permission groups such as "Administrators", "Users", and "Guests", there typically is a file server that grants users in the "Administrators" group all rights, grants "Users" the rights to "read", "write", and "execute" and grants "Guests" only "read" privileges.

In one embodiment in which a client device (e.g., personal computer) is connecting to the file server (and establishing a remote file access session), the system first determines the user's identity using traditional authentication technology. Next, the system queries the security attributes of the client, and checks if those attributes are acceptable according to the access policy (security policy); this can happen by either consulting a cached policy or querying a remote policy server. A cached policy is a policy stored (e.g., stored on the client device or on the server), which has been sent through some other means (e.g., sent to the client by a policy server). For example, the client (or the server) may have previously downloaded a policy file from a policy server via HTTP.

Querying a remote policy server (or other security evaluation service) for determining whether a client is in compliance with a security policy generally involves the following steps. First, the client connects to and sends the current list of security attributes to the policy server, which is packaged in a suitably formatted query message that also includes the user's identity. Next, the policy server uses the user's identity, IP address, connection location, and/or other parameters, to determine which access policy (security policy) should be used to evaluate the user's device (i.e., the client device). These policies usually would have previously been configured and assigned by the system's administrator. The policy server then examines the list of security attributes that it received from the client, and checks those attributes using the rules described in the access policy. The result of the policy server's examination is returned to the client (and/or to one or more server(s) or resources to which the client is requesting access) in a message that indicates the client is "compliant" or "non-compliant". Although the above discussion provides for the evaluation to be performed at the policy server, those skilled in the art will appreciate that the evaluation may alternatively be performed (in whole or in part) at the client device. In this case, the policy server provides a list of the required attributes to the client device and the client device returns the results of the evaluation to the server.

These operations may be illustrated by an example of a user named "Alice" that is normally granted all privileges (i.e., "read", "write", "execute", "create", and "delete" privileges) on a file named "Alice's Important Document.doc" that is stored on her file server "\\ALICESERVER" at her office. When Alice logs onto her desktop PC ("ALICEWORK") in her office, the system determines that ALICEWORK is properly protected by a personal firewall and anti-virus system. Therefore, when Alice opens a file-sharing session from her PC ALICEWORK to her file server ALICE-SERVER, the file-sharing session grants her full privileges. However, when Alice connects to the server from her home computer ALICE-HOME, the system determines that her home PC is not running a personal firewall or anti-virus system, and is therefore not compliant with the required security policy. Therefore, her access privileges are reduced—either rejecting her file-sharing session or granting her only "read" privileges.

System Components

Figure 3:
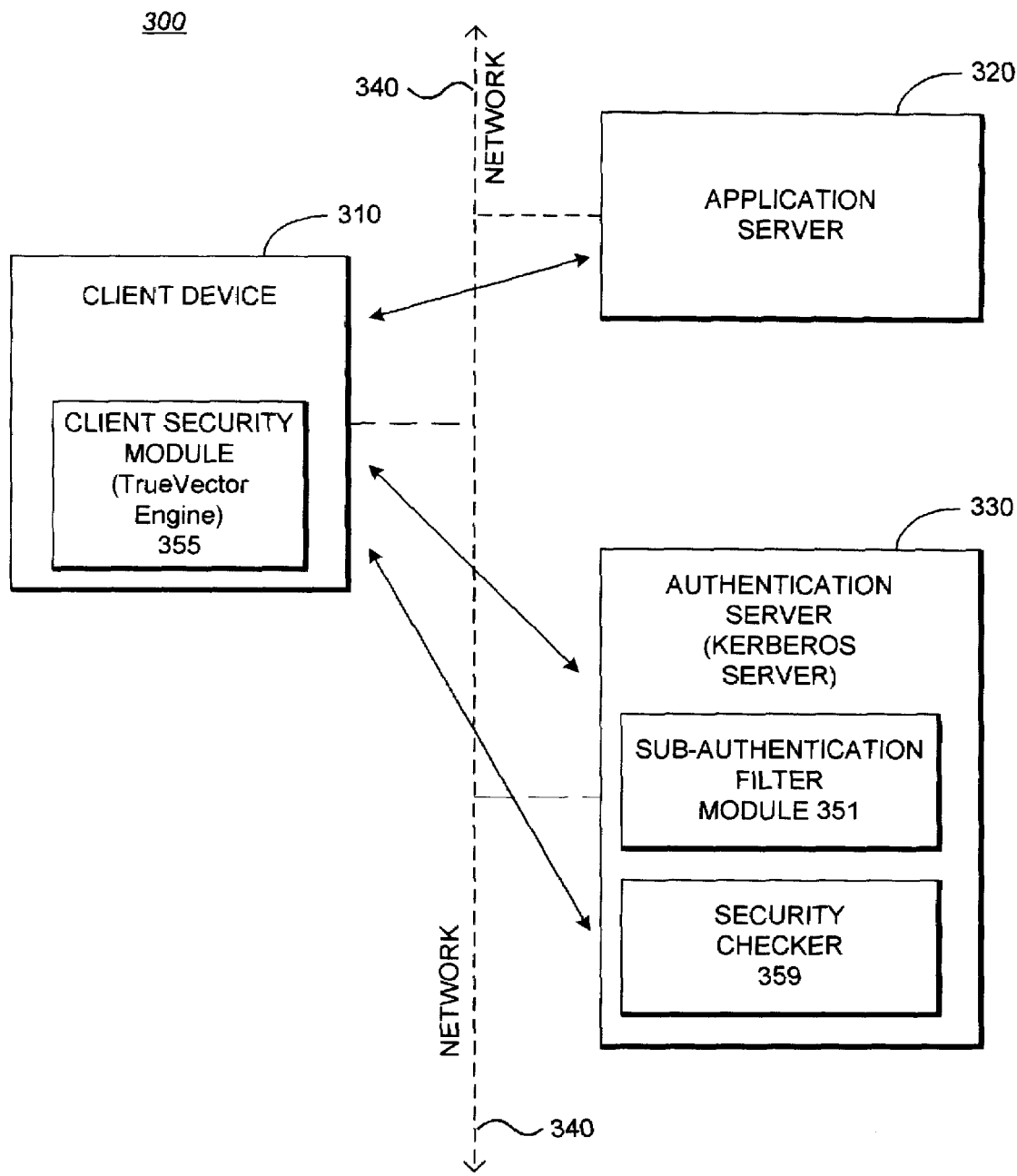
FIG. 3 is a block diagram of an environment in which the present invention may be embodied.

FIG. 3 is a block diagram of an environment 300 in which the present invention may be embodied. As shown, environment 300 includes a client device (PC) 310, an application server 320, and an authentication server 330 which are connected to each other via a network 340. As also shown, components of the present invention are installed on the client device 310 and on the authentication server 330. As shown at FIG. 3, a client security module 355 of the present invention is installed on the client device 310 and a sub-authentication filter module 351 and security checker 359 are installed on the authentication server 330.

The client device 310 may be a standard personal computer, such as the above-described system 100. Alternatively, the client 310 may be a laptop computer, notebook computer, personal digital assistant (PDA), or "smart" phone. The client security module 355 is installed and running on the client device 310. The client device 310 is connected via the network 340 to the application server 320. The application server 320 may be any type of application server that accepts tickets (or other instructions) from the authentication server 330 in order to authorize performance of certain transactions or interactions. For example, the application server 320 may accept Kerberos tickets from a Kerberos authentication server.

It should be noted that for purposes of the following discussion the client 310 may connect to the network 340 using either a wireline or wireless connection. For example, a client may use a wireline connection (e.g., dial-up, ISDN, DSL, cable modem, T1, or the like) to connect to a network. The system and methodology of the present invention may also be used for clients connecting to a network through a wireless access point. Connecting to a network through a wireless access point that implements IEEE (Institute of Electrical and Electronics Engineers) 802.1x closely resembles the process of logging in to a network via a wireline connection. Accordingly, those skilled in the art will appreciate that the methodology of the present invention is not limited to wireline access to a network, but may also be advantageously employed in other environments, including wireless environments. In addition, although the above discussion refers to a client device connecting to a network, devices which may connect to a network for gaining access to other services may include servers as well as client devices.

In one embodiment, the authentication server 330 is a Kerberos server for handling user authentication. However, the present invention may be used with other authentication mechanisms, including, for example, the Generic Security Service API (GSS-API), the Extensible Authentication Protocol (EAP), and/or the RADIUS protocol. For example, when the client device 310 connects to the application server 320, the authentication server 330 is invoked to authenticate the user. In accordance with the methodology of the present invention, when the authentication sever 330 authenticates the identity of the user (i.e., the user of client device 310), it then invokes the sub-authentication filter module 351. The sub-authentication filter module 351, in turn, invokes the security checker module 359. The security checker module 359 uses a "client monitoring protocol" (or "CMP") to check if the client device 310 is in compliance with a required access policy (security policy). Access by the client device 310 to the application server 320 may be regulated based upon compliance with the security policy as hereinafter described.

It should be noted that the above is only one example of an environment in which the system and methodology of the present invention may be successfully employed. In particular, a Kerberos server is used as an example for discussion purposes and is not required for implementation of the present invention. The present invention may be used with a variety of authentication mechanisms, including, for example, GSS-API, EAP (the Extensible Authentication Protocol), and/or the RADIUS protocol. As will be described below, the system and methodology of the present invention may be implemented in a number of different environments. For example, the methodology of the present invention may be implemented using sub-authentication filters in a Windows environment, through the use of Pluggable Authentication Modules in a Solaris/Linux environment, as well as through Kerberos authentication. The operations of the present invention in several different environments will now be described in more detail.

Sub-Authentication Filters in Windows

Components of Typical Windows Sub-Authentication Filter Implementation

Figure 4:
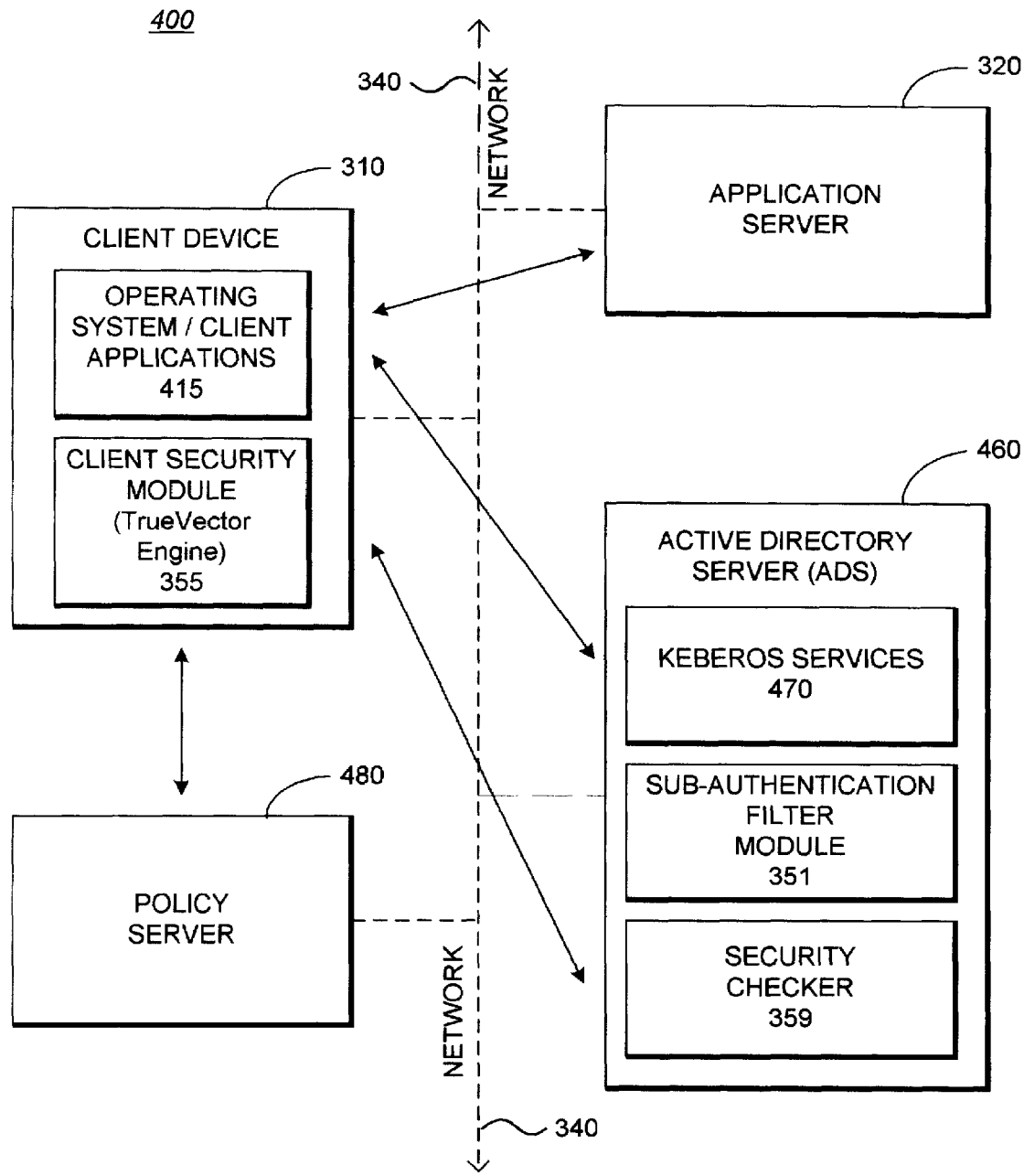
FIG. 4 is a block diagram illustrating in more detail an environment in which the present invention is implemented using sub-authentication filters in a Windows environment.

FIG. 4 is a block diagram illustrating in more detail an environment 400 in which the present invention is implemented using sub-authentication filters in a Windows environment. In the Windows operating system, a dynamic link library (DLL) referred to as a "sub-authentication module" can be implemented to filter logon requests from client devices. The sub-authentication module can determine which client device is requesting authentication, and then apply additional rules to determine if the client is allowed to access the services. The DLL can also modify security account manager (SAM) database entries to alter the security privileges of the client device.

As shown at FIG. 4, a typical Windows implementation includes many of the same components previously described and illustrated at FIG. 3. These components include a client device 310, a client security module (TrueVector engine) 355, an application server 320, a sub-authentication filter module (sub-authentication DLL) 351, a security checker 359, and an Ethernet network 340 to allow the software modules and other components to communicate with each other. In a typical Windows installation, an Active Directory Server (ADS) 460 serves as the authentication server and uses Kerberos authentication services 470 for authentication of clients (e.g., client device 310) connecting to the application server (e.g., application server 320). A policy server 480 is provided for storing a security policy (access policy) which is required to be implemented as a condition for accessing the application server 320. As also shown at FIG. 4, an operating system and client applications 415 are installed on the client device 310. The operation of these components will now be described.

Figure 5A:
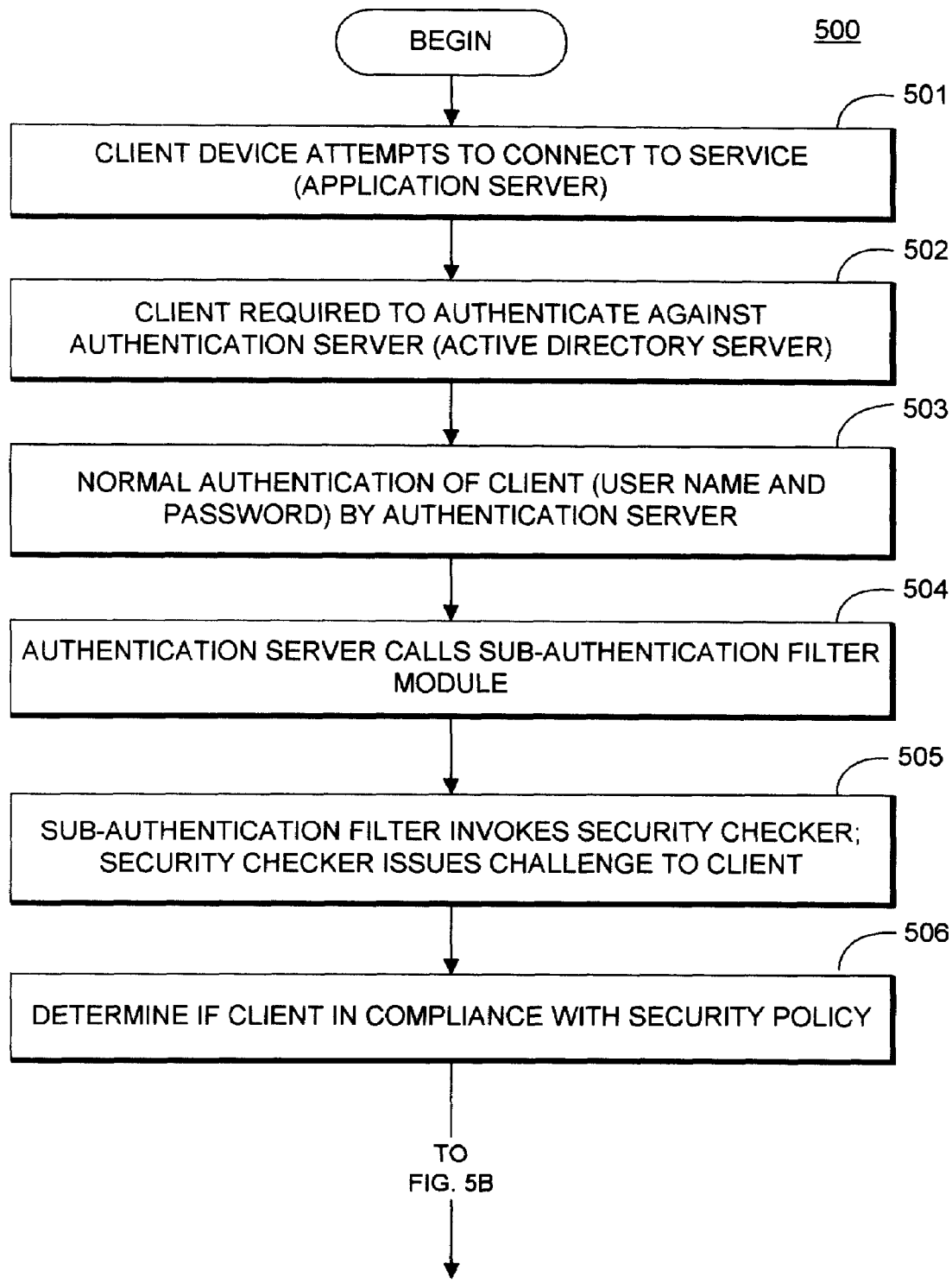
FIGS. 5A-B comprise a single flowchart illustrating the operation of the present invention in authenticating a client attempting to access an application or service (e.g., on an application server).
Figure 5B:
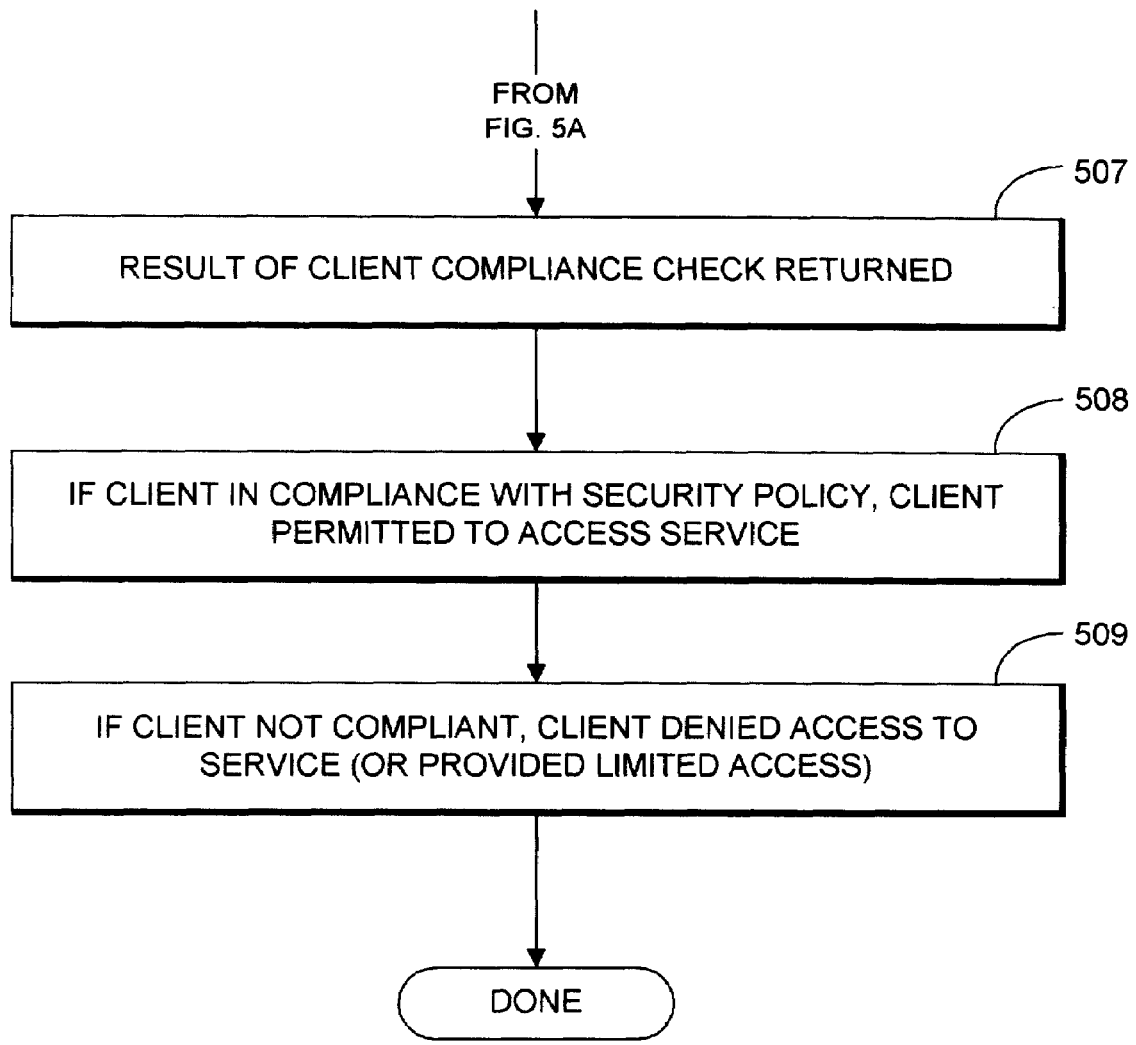

FIGS. 5A-B comprise a single flowchart 500 illustrating the operation of the present invention in authenticating a client attempting to access an application or service (e.g., on an application server). The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

As shown, the process begins at step 501 when a client device (e.g., client device 310) attempts to connect to a service (e.g., a service provided on the application server 320 as shown at FIG. 4). In order to connect to the application server 320, the client must first connect the client device 310 to the network 340 (e.g., by powering on the client device 310 if a connection has already been configured). By connecting to the network, the client 310 is now able to send communication packets to the application server 320 and the Active Directory Server (ADS) 460.

When the client device 310 attempts to access the application server 320, at step 502 the client is first required to log on to the network by authenticating against the ADS 460. At step 503, the client 310 and the ADS 460 (including the Kerberos services 470) each perform the steps required by the appropriate authentication protocol (e.g., Kerberos) for normal user identity (e.g., user name and password) authentication of the client. This includes passing authentication messages back and forth between the client and the ADS 460 for normal authentication of the client device 310. The exact content and number of these messages depends upon the authentication method configured for the system (e.g., by the system administrator). In a Windows environment, the method of authentication is frequently implemented in a module called a "Security Service Provider (SSP)". Further description of Kerberos authentication is provided in "RFC 1510—The Kerberos Network Authentication Service (V5)", available from the Internet Engineering Task Force (IETF), the disclosure of which is hereby incorporated by reference. A copy of RFC 1510 is available via the Internet (e.g., currently at www.ietf.org/rfc/rfc1510.txt). Also see e.g., "RFC 1964—The Kerberos Version 5 GSS-API Mechanism", available from the IETF, the disclosure of which is hereby incorporated by reference. A copy of RFC 1964 is available via the Internet (e.g., currently at www.ietf.org/rfc/rfc1964.txt).

Authentication Message Sequence

One example of an authentication message sequence is a simple Kerberos user name/password challenge-response protocol, which follows the following sequence:

1. The client device (e.g., PC) 310 sends packet to the ADS 460 containing the user name and requesting authentication.

2. The ADS 460 sends packet to the client device 310 challenging the password and containing a challenge key which is a sequence of random characters.

3. The client device 310 retrieves the password from the end user.

4. The client device 310 concatenates the random characters to the end-user's password, places the resulting string into a buffer, and then generates a one-way hash value of the buffer contents (e.g., using an MD5 algorithm).

5. The client device 310 sends the MD5 hash value to the ADS 460 in a packet to request authentication.

6. The ADS 460 also computes the same MD5 hash value using the password it has stored in its database together with the challenge sequence.

7. The ADS 460 compares the two hash values. If they match, the ADS 460 has authenticated the user. If they do not match, the ADS 460 rejects the authentication of the client device 310.

Kerberos Service Invokes Sub-Authentication Filter

If the ADS 460, using its configured Security Service Provider (e.g., Kerberos services 470), manages to authenticate the user, then at step 504 the Kerberos services 470 calls a sub-authentication filter module 351 registered in the system registry. The sub-authentication filter module 351 is intended to allow customization of the logon approval process without having to change the Security Service Provider (e.g., Kerberos service) itself; as SSPs are complex pieces of software, whereas a sub-authentication filter is much simpler to implement.

In the presently preferred embodiment in a Windows environment, the sub-authentication filter module 351 implements a "Msv1_0SubAuthenticationFilter" function (described below), which can return a value to indicate that the user should be logged on, or can return a value to indicate the user should not be logged on to the system. The filter function can also return a variety of other connection attributes including security group membership and Kerberos ticket validity lifetime. In the presently preferred embodiment of the system, a primary function of the sub-authentication filter module 351 is to check whether the user (e.g., the client device 310 in this example) is in compliance with a required security policy. To perform this check, the sub-authentication filter module 351 invokes the security checker module 359 as will now be described.

Security Challenge to Client

After the security checker 359 is invoked by the sub-authentication filter module 351, at step 505 the security checker issues a challenge to the client security module 355 on the client device 310. More particularly, the security checker 359 challenges the TrueVector engine of the client security module 355 using a "client monitoring protocol" or "CMP" challenge message. In response, at step 506 the TrueVector engine of the client security module 355 consults the policy server 480 for obtaining the current security policy and compares the current security policy to the cached policy stored locally on the client device 310. As part of this process, the client security module 355 on the client device 310 determines whether the client is in compliance with this updated (i.e., current) security policy. The TrueVector engine of the client security module 355 then returns the result of this compliance check to the security checker 359.

In an alternative embodiment, the policy server 480 may perform the security check. The process for the policy server 480 checking whether a client is in compliance with a required security policy generally involves the performance of the following steps:

1. The client security module 355 on the client device 310 connects to and sends the current list of security attributes to the policy server 480. The list of security attributes is packaged in a suitably formatted query message that also includes the user's identity.

2. The policy server 480 uses the user's identity, IP address, connection location, and/or other parameters to determine which security policy should be used to evaluate the user and the client device 310. These policies would have previously been configured and assigned by the system's administrator.

3. The policy server 480 examines the list of security attributes that it received from the client device 310, and checks those attributes using the rules described in the security policy.

4. The result of the examination process by the policy server 480 is returned to the client device 310 in a message that indicates "compliant" or "non-compliant". The client may then return the result of this compliance check to the security checker 359. Alternatively (or in addition), the policy server 480 may return the result directly to the security checker 359.

Grant of Privileges to the Client Based on Security Check

In the presently preferred embodiment, the security checker 359, in turn, returns a value (e.g., numerical value) at step 507 to indicate the status of the client that was checked (e.g., the client device 310). For example, if the value returned number is equal to 0, then the client is accepted as secure and the sub-authentication filter module 351 will typically authorize the user (e.g., client device 310) to access the application server 320 at step 508 by returning "STATUS_SUCCESS" as a return code. If the security checker 359 returns a non-zero value (e.g., a value of 1 or greater) to the sub-authentication filter module 351, then the client is not accepted as secure and at step 509 the sub-authentication filter module 359 will deny authorization to access the application server 320 by returning an error code.

Alternatively, if the client is not accepted as secure the sub-authentication module 359 may authorize the user (e.g., client 310) to access the application server, but alter the user's access group membership by altering the user's group membership in a "UserAll->SecurityDescriptor" data structure that was passed into the sub-authentication filter module 351. This data structure is a self-referential security descriptor that describes the security privileges of an account. Changing this data structure alters the contents of a SAM (security account manager) database when the sub-authentication filter module 351 returns the result of the security check. In one embodiment of the system, the group membership of the user is changed to grant only limited group membership when the user (client) is not in compliance with the current security policy. In this manner, the user can be granted access to the network using "Guest" group privileges only. In this event, the computers in the domain can be configured to allow members of the "Guest" group read-only access to their services, for instance. This group membership privilege is typically encoded into a Kerberos ticket issued by a Kerberos key distribution center (KDC) component of the Kerberos services 470.

ADS Issues a Kerberos Ticket to the Client

Upon successful authentication, the Kerberos services 470 of the ADS 460 will authorize the client to access the application server 320. Typically, the Kerberos KDC service will grant the client 310 a Kerberos ticket that will allow the client to connect and authenticate against the application server 320 (and/or other application servers in the domain). The ticket generally contains, among other things, an "Authorization-Data" field that contains, in a Microsoft ADS implementation, a "SecurityDescriptor" data structure. This "SecurityDescriptor" data structure describes, among other things, the group memberships the user of the client device is assigned.

Authorizing a Transaction by Checking the Kerberos Ticket

When the client device attempts to perform a transaction with any Kerberos-compatible application server in the network, the application server will request from the client proof that it has permission to perform the transaction, in the form of the Kerberos ticket that was issued to the client. If the client has been successful in authenticating with the ADS server, then it will have been issued a Kerberos ticket that the application server can use to authorize the transaction. However, if the client has been issued a Kerberos ticket that contains only "Guest" group membership privileges, then the application server might deny access to the client, or it may authorize only limited privileges for the transaction.

The precise set of privileges granted to members of each ADS group can vary depending on various factors, including the kind of application server that is involved. For example, if the application server is a file server, the user rights granted to a "Guest" user may be limited to "read only access to the Guest share folder; no access to any other folder". Those skilled in the art will appreciate that various other privileges may be configured and assigned to clients using the methodology of the present invention.

Operations with Kerberos

Figure 6A:
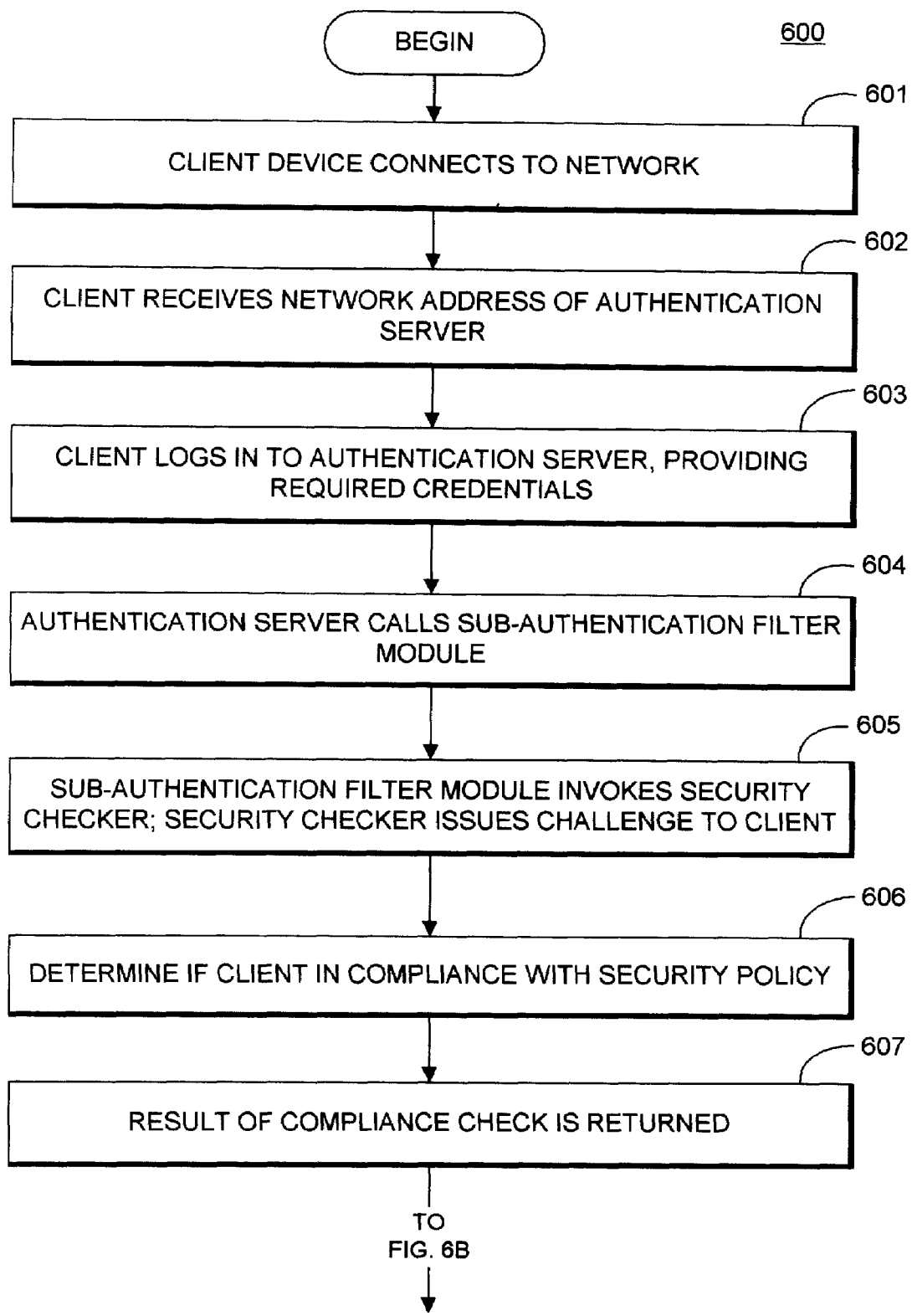
FIGS. 6A-B comprise a single flowchart illustrating the operations of the present invention in authenticating a client accessing a service in a Kerberos implementation.
Figure 6B:
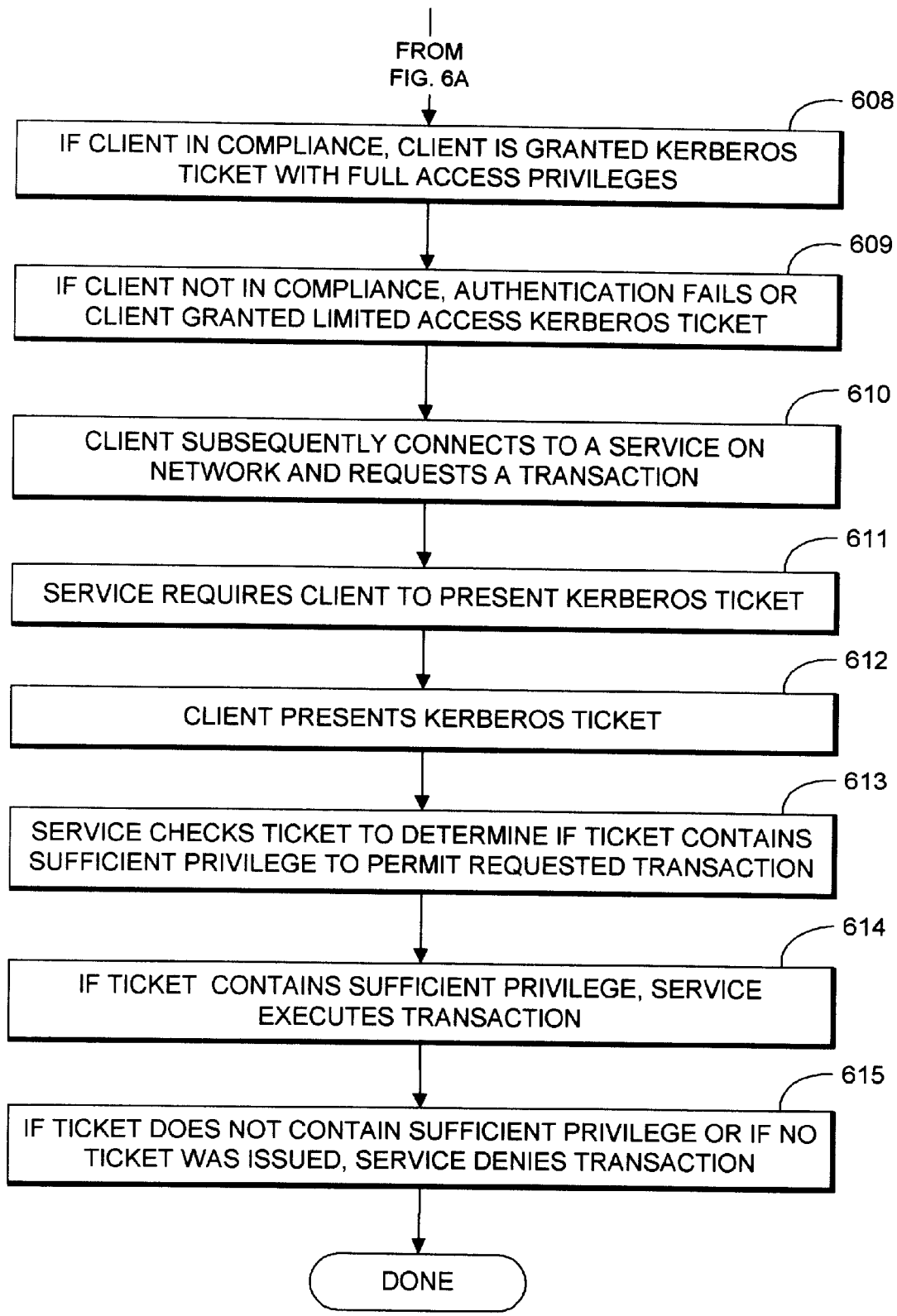

FIGS. 6A-B comprise a single flowchart 600 illustrating the operations of the present invention in authenticating a client accessing a service in a Kerberos implementation. As with the prior flowchart, the following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The process begins at step 601 with a client (e.g., a personal computer) connecting to a network to attempt to gain access to a service available on the network. At step 602 the client receives the network address of an authentication server. Next, at step 603 the client logs in to the authentication server and provides required credentials (e.g., user name and password or other credentials). The client and the authentication server perform the steps required for normal user identity (e.g., user name and pass-word) authentication of the client.

After the user is initially authenticated (e.g., based on user name and password), at step 604 the authentication server calls a sub-authentication filter module. At step 605, the sub-authentication filter module invokes a security checker module. The security checker module issues a security challenge. As previously described, the security challenge may be issued directly to the client or by requesting results of a security evaluation previously performed by a policy server or other security evaluation service. Next, at step 606 a determination is made as to whether the client is in compliance with the security policy required for access. In the presently preferred embodiment, this determination is made at the client in most cases; however, the determination may also be made by the server issuing the challenge or by a separate security evaluation service (e.g., policy server or the like). The result of the compliance check is returned at step 607.

If the client is in compliance with the security policy, at step 608 the client is granted a Kerberos ticket containing appropriate access privileges (e.g., full access privileges). However, if the client is not in compliance with the policy, at step 609 the authentication of the client fails or the client is granted a limited access Kerberos ticket (i.e., limited privileges, such as read-only access or access to only certain resources).

At step 610 the client subsequently connects to a service available on the network and requests a transaction. In response, at step 611 the service requires the client to present its Kerberos ticket. At step 612 the client presents the Kerberos ticket to the service in response to the request. At step 613 the service checks the ticket to determine if it contains sufficient privilege to permit the requested transaction. If the ticket contains sufficient privilege to permit the transaction, at step 614 the service executes the transaction. However, if the Kerberos ticket does not contain sufficient privilege, or if no ticket was issued to the client, at step 615 the service denies the transaction requested by the client.

Kerberos Implementation

A pure Kerberos implementation may be constructed to perform the same authentication process described above. However, unlike the case of the above-described Microsoft Windows ADS implementation, no sub-authentication filter module is required for a pure Kerberos implementation. Those skilled in the art will appreciate similar functionality can be built into the readily available open-source Kerberos implementations (e.g., MIT Athena, MAC OSX) instead of implementing such functionality in separate sub-authentication modules.

The steps listed above for the Microsoft sub-authentication operation describe the operational steps that are applicable in the case of a general Kerberos implementation. However, the sub-authentication module is replaced with built-in code in the Kerberos implementation which accomplishes the same task as an external sub-authentication filter module (including the functions of the security checker module).

Pluggable Authentication Modules

Figure 7:
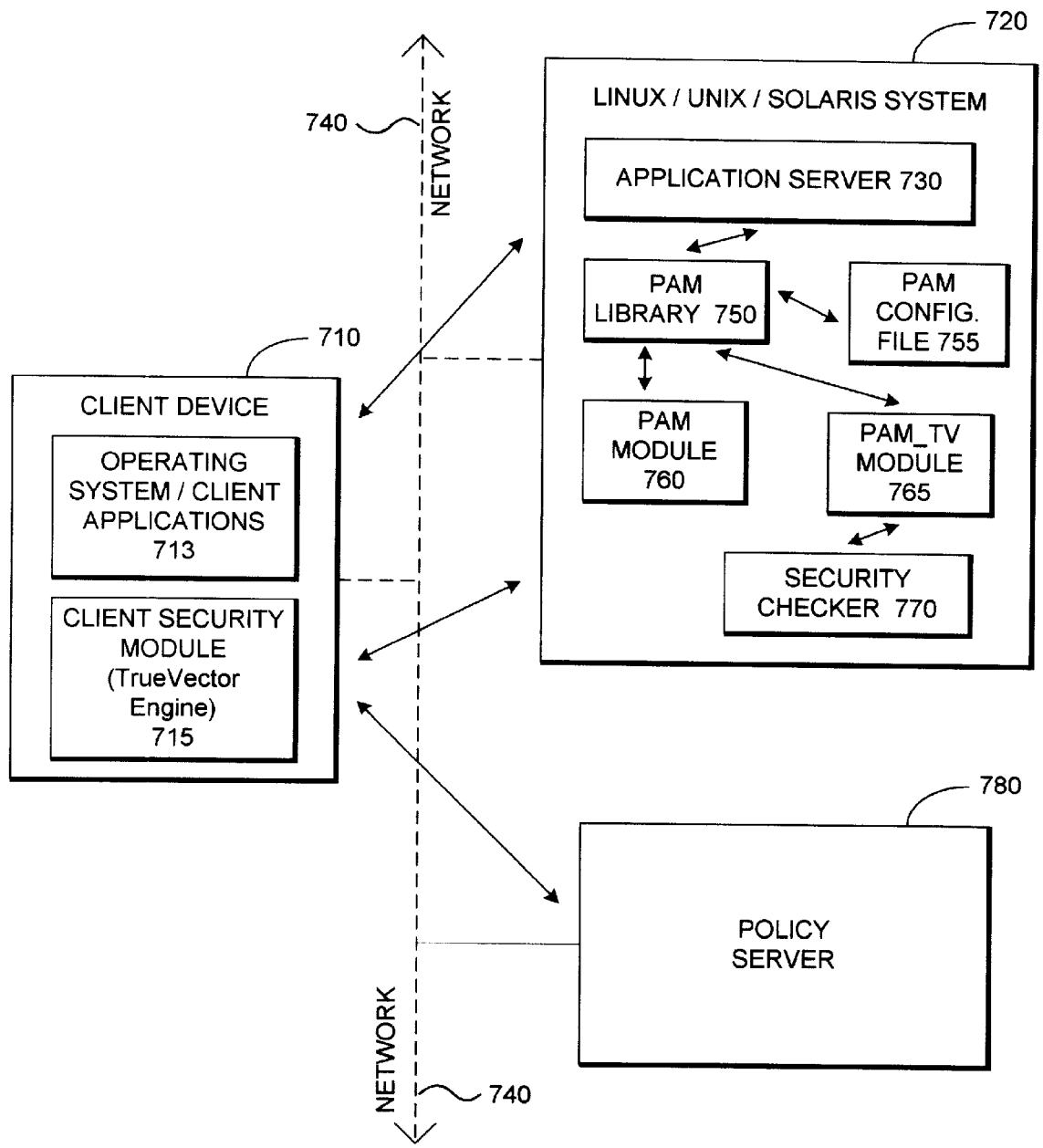
FIG. 7 is a block diagram illustrating an environment in which the methodology of the present invention may be implemented in a Linux, UNIX, or Solaris environment using Pluggable Authentication Modules.

FIG. 7 is a block diagram illustrating an environment 700 in which the methodology of the present invention may be implemented in a Linux, UNIX, or Solaris environment using Pluggable Authentication Modules. Pluggable Authentication Modules (or "PAM modules") allow multiple authentication mechanisms to be used collectively or independently. As shown, the environment 700 includes a client device 710 connected to a system 720 and a policy server 780 via a network 740. The system 720 may be running a Linux, UNIX, or Solaris operating system and includes an application server 730, a PAM library 750, a PAM configuration file 755, a PAM (standard authentication) module 760, a PAM_TV module 765, and a security checker 770. Although these modules are shown as being installed together on a single machine, they may also be installed on different machines, as desired. The client device 710 includes an operating system/client applications 713 and the client security module (TrueVector engine) 715 as previously described. The operations of these components in authentication of a user will now be described.

Initially, the Pluggable Authentication Modules are configured to require an additional authentication method for each protected service on the system 720. An additional PAM module(s) is added for authentication of a user (client) on a designated (named) service (e.g., a service provided by the application server 730). It should be noted that the PAM module(s) which is added for purposes of implementing the methodology of the present invention is typically an additional module that works in conjunction with another module that performs the primary authentication based on user identity. As shown at FIG. 7, the PAM_TV module 765 implements the methodology of the present invention for supplemental authentication of the user. This PAM_TV module 765 is typically used in conjunction with a standard PAM module 760 which authenticates a client in a standard fashion based upon user identity (e.g., user name and password). In this case, both of the PAM modules used for user authentication (e.g., PAM module 760 and PAM_TV module 765) are listed in the PAM configuration file 755 in the appropriate order. Those skilled in the art will appreciate, however, that a single module providing for both authentication of user identity and supplemental authentication of other attributes could be used instead of multiple modules, if desired.

When a client (e.g., client device 710) attempts to connect to the application server 730, the required PAM modules are invoked by the application server 730 (via the PAM library 750) to authenticate the user (e.g., based on user identity) as well as to authenticate (or authorize) the client device for access based upon supplemental attributes of the user and/or the client device. A "pam_sm_authenticate" function or a "pam_sm_open_session" function is called, as appropriate, to approve the authentication of the client or a new application server session for the client (e.g., the client device 710).

When the PAM_TV module 765 implementing the methodology of the present invention is invoked, it calls the client security checker 770 (described below) to perform the check on the client computer's security. This security check may be performed directly or indirectly. For instance, the security check can be performed by issuing a challenge to the client and evaluating the response in a manner similar to that described above for the Windows sub-authentication filter implementation. Alternatively, a separate security evaluation service (e.g., a policy server) may be consulted for the result of a prior security evaluation. Based on the examination of the attributes of the client device 710, the security checker 770 typically returns a value of zero (0) to indicate that the client is secure, or a value of one (1) or above to indicate that the client is not secure. If the client security checker 770 returns a zero value, indicating that the client is secure (i.e., in compliance with the required security policy), the PAM_TV module 765 returns "PAM_SUCCESS" to allow the authentication to succeed. However, if the security checker 770 returns a non-zero value, the PAM_TV module 765 returns "PAM_AUTH_ERR" to prevent the authentication of the client from succeeding. For example, if the PAM library 750 returns "PAM_SUCCESS" to the application server 730, the application server 730 grants access to the client device 710; otherwise, it denies access.

It should be noted that instead of simply blocking or granting access to the client device, a client found not to be in compliance may permitted to access the application server 730, but with reduced privileges. For instance, the user may be permitted to access the application server, but provided with read-only access. Those skilled in the art will appreciate that various other privileges may be configured and assigned to clients based on the results of the compliance evaluation. One embodiment of the present invention implemented using sub-authentication filters in a Windows environment will next be described in greater detail.

Detailed Internal Operation

Sub-Authentication Filters in a Windows Environment

As described above, in the Windows operating system, a DLL called a "sub-authentication module" can be implemented to filter log on requests from client devices (e.g., client PCs). The module can determine which client is requesting authentication, and then apply additional rules to determine if the client is allowed to access particular services (e.g., determining if the client is in compliance with a security policy). The DLL can also modify security account manager (SAM) database entries to alter the security privileges of the client device. Additional information regarding implementation of a sub-authentication filter module in Windows is available from Microsoft Corporation and is available via the Internet (e.g., currently at msdn.microsoft.com/library/en-us/security/security/msv1_0subauthenticationroutine.asp).

In the following example, a "Msv1_0SubAuthenticationFilter" function is implemented and exported from a DLL:

```
 1: NTSTATUS
 2: NTAPI
 3: Msv1_0SubAuthenticationFilter (
 4:    IN NETLOGON_LOGON_INFO_CLASS LogonLevel,
 5:    IN PVOID LogonInformation,
 6:    IN ULONG Flags,
 7:    IN PUSER_ALL_INFORMATION UserAll,
 8:    OUT PULONG WhichFields,
 9:    OUT PULONG UserFlags,
10:    OUT PBOOLEAN Authoritative,
11:    OUT PLARGE_INTEGER LogoffTime,
12:    OUT PLARGE_INTEGER KickoffTime
13:    );
```

The above "Msv1_0SubAuthenticationFilter" function is registered as an "Auth0" handler, which is the general authentication filter for a Windows machine or a Domain Controller. The authentication filter function returns "STATUS_SUCCESS" if the authentication is approved, or an error code if the authentication is not approved. The "Logoninformation" field at line 5 above is a pointer to a "NETLONON_LOGON_IDENTITY_INFO" data structure, which includes information about the client logging on, including the user name, authenticating domain, and the client workstation or device.

The following sub-authentication filter module invokes a security checker routine which is responsible for sending a challenge packet to a client workstation (device) for authentication of the client device:

```
 1: Msv1_0SubAuthenticationFilter (
 2:    IN NETLOGON_LOGON_INFO_CLASS LogonLevel,
 3:    IN PVOID LogonInformation,
 4:    IN ULONG Flags,
 5:    IN PUSER_ALL_INFORMATION UserAll,
 6:    OUT PULONG WhichFields,
 7:    OUT PULONG UserFlags,
 8:    OUT PBOOLEAN Authoritative,
 9:    OUT PLARGE_INTEGER LogoffTime,
10:    OUT PLARGE_INTEGER KickoffTime
11:         )
12: {
13:    NTSTATUS Status;
14:    SYSTEMTIME CurrentTime;
15:    PNETLOGON_LOGON_IDENTITY_INFO Identity =
16:    (PNETLOGON_LOGON_IDENTITY_INFO)LogonInformation;
17: WCHAR wszComputerName[MAX_COMPUTERNAME_LENGTH+1];
18:    DWORD cbSize = MAX_COMPUTERNAME_LENGTH+1;
19:
20:    Status = STATUS_SUCCESS;
21:
22:    *Authoritative = TRUE;
23:    *UserFlags = 0;
24:    *WhichFields = 0;
25:
26:
```

-continued

```
27:    GetLocalTime( &CurrentTime );
28:
29:    if(!Identity)
30: {
31:    logprintf("No identity\r\n");
32:    return Status;
33:    }
34:
35:
36:    logprintf(
37:    "%02d/%02d/%d %02d:%02d:%02d: Logon (level=%d
)%wZ\\%wZ (%wZ)
from %wZ\r\n",
38:    CurrentTime.wMonth, CurrentTime.wDay, CurrentTime.
wYear,
39:    CurrentTime.wHour, CurrentTime.wMinute, Current
Time.wSecond,
40:    LogonLevel,
41:    &Identity->LogonDomainName, &Identity->UserName,
42:    &UserAll->FullName, &Identity->Workstation);
43:
44:
45:    switch ( LogonLevel )
46:    {
47:    case NetlogonInteractiveInformation:
48:    case NetlogonServiceInformation:
49:    case NetlogonNetworkInformation:
50:    GetComputerNameW( wszComputerName, &cbSize )
;
51:
52:    // If client is remote
53:    if (Identity->Workstation.Buffer != NULL &&
54:    wcsncmp(Identity->Workstation.Buffer, wszComputerName,
Identity->Workstation.Length ) != 0)
55:    {
56:    // check the client using the checkclient utility
57:
58:    if (_wspawnl (_P_WAIT, L"checkclient.exe",
59: Identity->Workstation.Buffer) != 0)
60:    {
61:    Status = ERROR_INVALID_WORKSTATION;
62:    logprintf("Invalid foreign workstation login from:
%wZ\",
&Identity->Workstation );
63:    }
64:
65:    }
66:    LARGE_INTEGER CurrentUTCTime;
67:    QuerySystemTime( &CurrentUTCTime );
68:
69:    if (LogoffTime)
70:    {
71:    // this sets the ticket lifetime to HeartbeatRate
(30 minutes default)
72:    LogoffTime->QuadPart = CurrentUTCTime.QuadPart
+
(HeartbeatRate * 10000000);
73:    }
74:
75:    if (KickoffTime) {
76:    KickoffTime->HighPart = 0x7FFFFFFF;
77:    KickoffTime->LowPart = 0xFFFFFFFF;
78:    }
79:    break;
80:
81:    default:
82:    return STATUS_INVALID_INFO_CLASS;
83:    }
84:
85:    return Status;
86: }
```

As shown at lines 58-59, the sub-authentication filter module invokes a security checker routine named "checkclient.exe". This security checker, when invoked, issues a challenge packet requesting the client to confirm its security attributes. The security checker then verifies the identity of the client and determines if the attributes of the client device are appropriate according to the required security policy. If the attributes are not appropriate (e.g., the client is not in compliance with a required security policy) then the security checker routine returns an error from the filter function.

Implementation in a Kerberos System

In a network environment with many service applications distributed on different network nodes, a Kerberos-based authentication/authorization system is often used. In a Kerberos implementation, the authentication system is separated from the service requesting the authentication. When the client wishes to utilize a service application, the client logs on to a Kerberos "key distribution center" (or "KDC" server). For standard user identity authentication, if the client can be authenticated using a normal authentication protocol (e.g., user name/password), the client is given a "ticket". This ticket is then presented to the service when the client connects to the application service, through an "Internet Key Exchange" (or "IKE") protocol. The ticket contains data indicating what types of services it can provide access to, and it also contains an expiration date. Most importantly, the ticket also contains cryptographic information used to validate the integrity and validity of the ticket itself; this allows the application service to safely grant access to a ticket-holding client without having to check back with the Kerberos authentication server.

To implement the security checking mechanism of the present invention in a Kerberos environment simply requires that the client security checking be done as part of the KDC interaction/authentication process as described above. The client security checking is performed against the KDC server instead of exchanging the client security information with the application server. If the client computer is not in compliance with the required security policy, the KDC server can either reject the client (i.e., not issue a ticket to the client), or it can grant the client a ticket with more limited access privileges than would normally be granted to an end user that is in compliance with the security policy.

In a network using a Microsoft Active Directory Server (ADS) for authentication, it is possible to implement this same type of behavior. This same type of behavior may be established by implementing and registering a "Msv1_0SubAuthenticationFilter" function on all Domain Controllers (containing Kerberos KDCs) in the network.

Pluggable Authentication Modules in Unix/Solaris/Linux

In the Unix family of operating systems (including Solaris and Linux), Pluggable Authentication Modules (PAM modules) can be used to assign specific authentication methods to specific services. With the Pluggable Authentication Module (PAM) framework, multiple authentication technologies can be added without changing any of the login services, thereby preserving existing system environments. PAM modules can be used to integrate login services with different authentication technologies, such as RSA, DCE, Kerberos, S/Key, and smart card based authentication systems. Thus, Pluggable Authentication Modules enable networked machines to exist peacefully in a heterogeneous environment, where multiple security mechanisms are in place.

The following example illustrates the signature of a "pam_sm_authenticate" method which is implemented and exported from a loadable library called "pam_coop.so":

```
1: PAM_EXTERN int
2: pam_sm_authenticate (pam_handle_t * pamh,
3:     int flags, int argc, const char **argv)
```

The PAM module is registered in a PAM configuration file and is associated with one or more services running on the server computer. The following is an example PAM configuration file named "/etc/pam.d/ftpd", which configures a number of authentication settings for an FTP (file transfer protocol) daemon:

```
1: # PAM configuration for ftpd
2:   auth      requisite   pam_securetty.so
3:   auth      required    pam_nologin.so
4:   auth      required    pam_env.so
5:   auth      required    pam_unix.so nulok
6:   account   required    pam_unix.so
7:   account   required    pam_coop.so
8:   session   required    pam_unix.so
9:   session   optional    pam_lastlog.so
10:  password  required    pam_unix.so nullok obscure min=4 max=8
```

Commonly, PAM configuration files are stored in the "/etc/pam.d" directory, and each file is associated with a service (e.g., an FTP daemon in this example) that is running on the computer. In this example, the file called "login" controls the main user login processing for the sever computer. Lines 1-6 and 8-10 above are configuration commands which would be commonly found in any PAM-compliant installation. Of particular interest, the code at line 7 indicates that the PAM system must invoke the "pam_coop.so" module in order to allow a user to login successfully, and it also indicates that if the "pam_coop.so module" denies access, then the user is not permitted to log into the computer (i.e., the server). Alternative PAM implementations may provide for storing configuration information in a single configuration file called "/etc/pam.conf". The information stored in this single configuration file is otherwise identical to the information stored in the "/etc/pam.d" directory.

When a client attempts to authenticate to the service, the service invokes the PAM subsystem to perform the authentication using the PAM authentication function "pam_authenticate". The PAM subsystem reads (or has read) the configuration file associated with the service and consults each of the authentication modules listed in the configuration file. Since one of the listed authentication modules is the module that implements client compliance checking, the "pam_coop.so module" will be called during the processing of the authentication. In particular, when a new session is created on the service for communicating with the client, the above "pam_sm_authenticate" method is invoked.

When the session is requested by a remote computer, most services will provide the host name of the remote computer making the access request. The following "pam_sm_open_session" method can retrieve this host name using a "pam_get_item" method as follows:

1:rhost_retval=pam_get_item(pamh, PAM_RHOST, (const void**)&rhost);

When the host address is retrieved, the address is passed to a utility to check the host integrity of the accessing client (remote host) as follows:

```
1:     if (_spawnl (_P_WAIT, "checkclient.exe",
2: rhost_retval) != 0)
3:     {
4:         logprintf("Invalid foreign workstation login from: %wZ\n",
       &Identity->Workstation );
```

```
5:     return PAM_AUTH_ERR;
6:     }
7:     else
8:         return PAM_SUCCESS;
```

As shown, a "checkclient.exe" utility is invoked at line 1. The "checkclient.exe" utility is a security checker responsible for communication with the client to check the security attributes of the client. This security checker sends a challenge packet to the remote host (i.e., client), requesting the client to confirm its security attributes. The security checker then determines if the attributes are appropriate according to the required security policy, and if they are not then the security checker returns an error (i.e., "return PAM_AUTH_ERR" as shown at line 5).

When the "pam_sm_authenticate" method returns, the PAM subsystem remembers the return value, and may continue calling the other PAM modules listed in the service's configuration file to confirm the user's authentication. When all the necessary modules have been consulted, the PAM subsystem computes the aggregate result of all the modules, as specified in the configuration file. The aggregate result will usually be "PAM_SUCCESS" if all the required modules returned "PAM_SUCCESS", otherwise it will be "PAM_AUTH_ERR" if any one of the required modules returned "PAM_AUTH_ERR". _The PAM subsystem then returns this result to the service, which accepts or rejects the user session based on this final authentication result. In the case of the FTP daemon above, the daemon can issue an FTP "530 Not logged in" error.

How Compliance is Requested and Communicated

In one embodiment, the security checker (i.e., the above-described "checkclient" utility) employs a "client monitoring protocol" for communication with the client. The client monitoring protocol (CMP) is a simple monitoring protocol that is used to check the security attributes of the client device (e.g., that a particular security solution is installed on the client computer and/or that the client is running a particular version of the security solution). The CMP may also be used to monitor and enforce compliance with any additional policies selected by the administrator (e.g., that the client is using particular anti-virus software). The CMP currently uses the UDP protocol on both the server-side and on the client-side. Challenge and response packets are encrypted for transmission between the client and the server. Each packet generally consists of a header, a body, and (optional) additional parameters. This structure ensures expandability and interoperability even if the server-side security checker and the client(s) use different versions of the protocol.

The server-side security checker module sends an initial CMP challenge packet to a client device seeking to access particular resources as part of the authentication process. The CMP challenge packet is a UDP message which is formulated and sent to the client. In the presently preferred embodiment, the challenge packet has a fixed header and it has additional parameters that can be selected as options in order to check for particular attributes or conditions at the client device. For example, a "client version" option allows the administrator to require that a specific minimum version of the security solution be installed on the client computer. An "anti-virus challenge" option provides for checking for anti-virus enforcement. The security checker module looks for the appropriate code to verify if the anti-virus program is running on the client machine and if both the anti-virus program and the associated data file are up to date. The security checker module may also issue periodic "heartbeat" challenges every N seconds or minutes, as determined by the monitoring frequency setting established by the administrator.

Upon receipt of a challenge packet, the client security module of the present invention (which is installed on the client device) formulates an appropriate response message using the same CMP protocol. The response message describes whether the client is currently compliant with the requirements provided in the challenge message. The security checker may then communicate the results of the security check and/or determine whether, and to what extent, the client should be permitted access based on the security check.

Those skilled in the art will appreciate that there are a number of other ways to communicate compliance status using other communication mechanisms. For example, security compliance may be checked using the EAP protocol which defines a challenge-response protocol between an authentication server and a client computer. For further information regarding EAP, see e.g., "RFC 2284: PPP Extensible Authentication Protocol", available from the Internet Engineering Task Force (IETF), the disclosure of which is hereby incorporated by reference. A copy of RFC 2284 is available via the Internet (e.g., currently at www.ietf.org/rfc/rfc2284.txt). As another example, the RADIUS protocol, which uses UDP messages to perform a challenge/response protocol, may also be used for compliance checking. For further information regarding RADIUS, see e.g., "RFC 2865: Remote Authentication Dial In User Service (RADIUS)", available from the IETF, the disclosure of which is hereby incorporated by reference. A copy of RFC 2865 is available via the Internet (e.g., currently at www.ietf.org/rfc/rfc2865.txt). Alternatively, certificates may be exchanged by the client and server via a TLS or TNT trust exchange.

The above discussion uses an example of how compliance status can be requested and communicated by issuing challenges to a client and receiving responses from the client. As previously discussed, there are a number of different ways in which security attributes may be communicated and validated. For instance, an alternative embodiment of the present invention provides for the additional security attributes to be validated through out-of-band communications via a separate security evaluation service. In this alternative embodiment, if a client has already connected to the network, the security attributes may have been previously evaluated by a separate security evaluation service (e.g., a policy server or the like). Typically, the security evaluation service evaluates security compliance at the time of initial authentication of the client. Subsequently, when the client requests a particular service or transaction, the results of the prior security evaluation are obtained from the security evaluation service rather than using the above challenge/response process directly with the client. In other words, when the client requested a particular service or application, the separate security evaluation service would be consulted for the result of a prior evaluation. Those skilled in the art will appreciate that there are a number of approaches that may be used to communicate regarding the compliance status of client devices requesting access to services or resources.

Figure 8A:
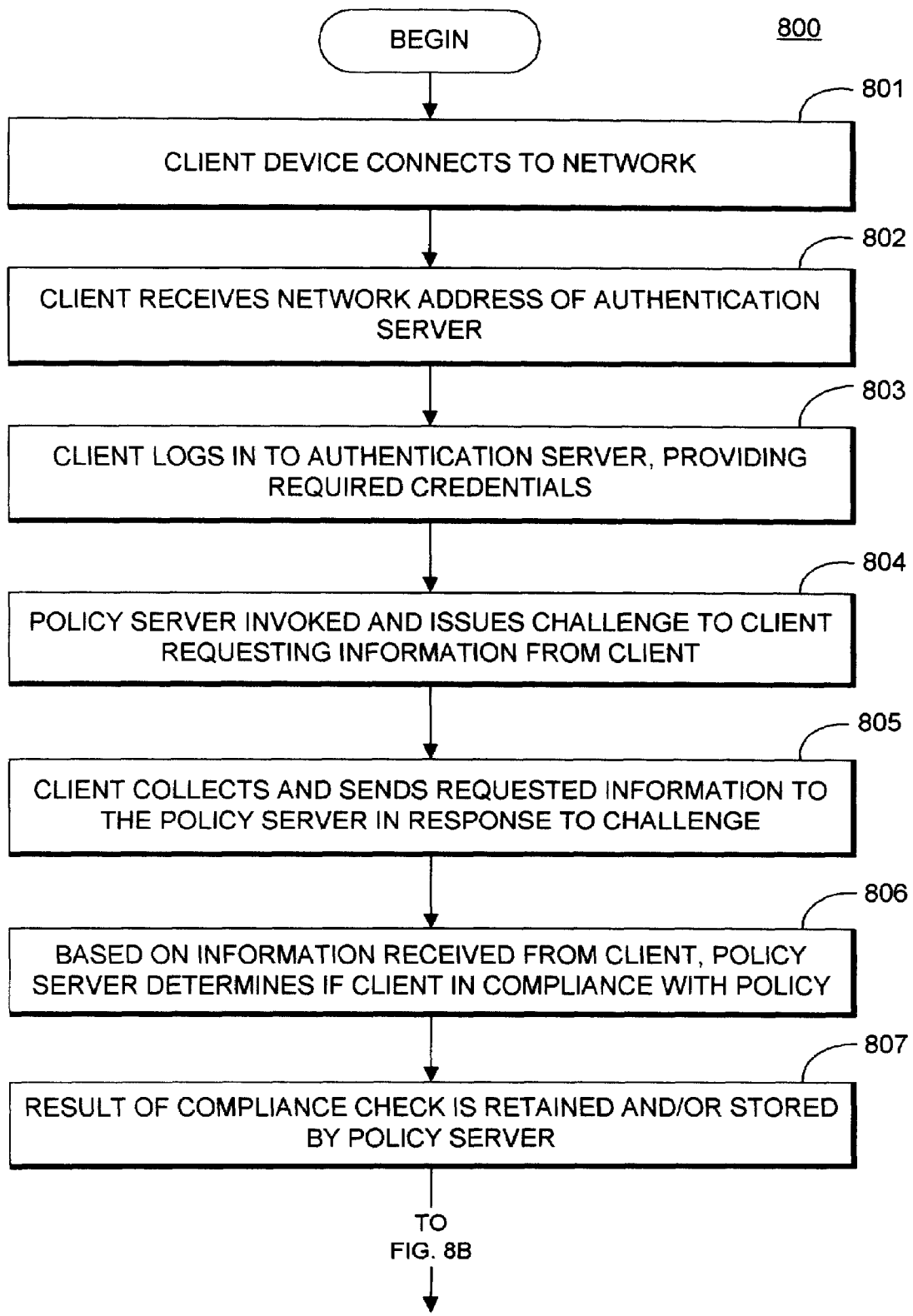
FIGS. 8A-B comprise a single flowchart illustrating the process of authenticating a client attempting to access an application or service through a separate security evaluation service.
Figure 8B:
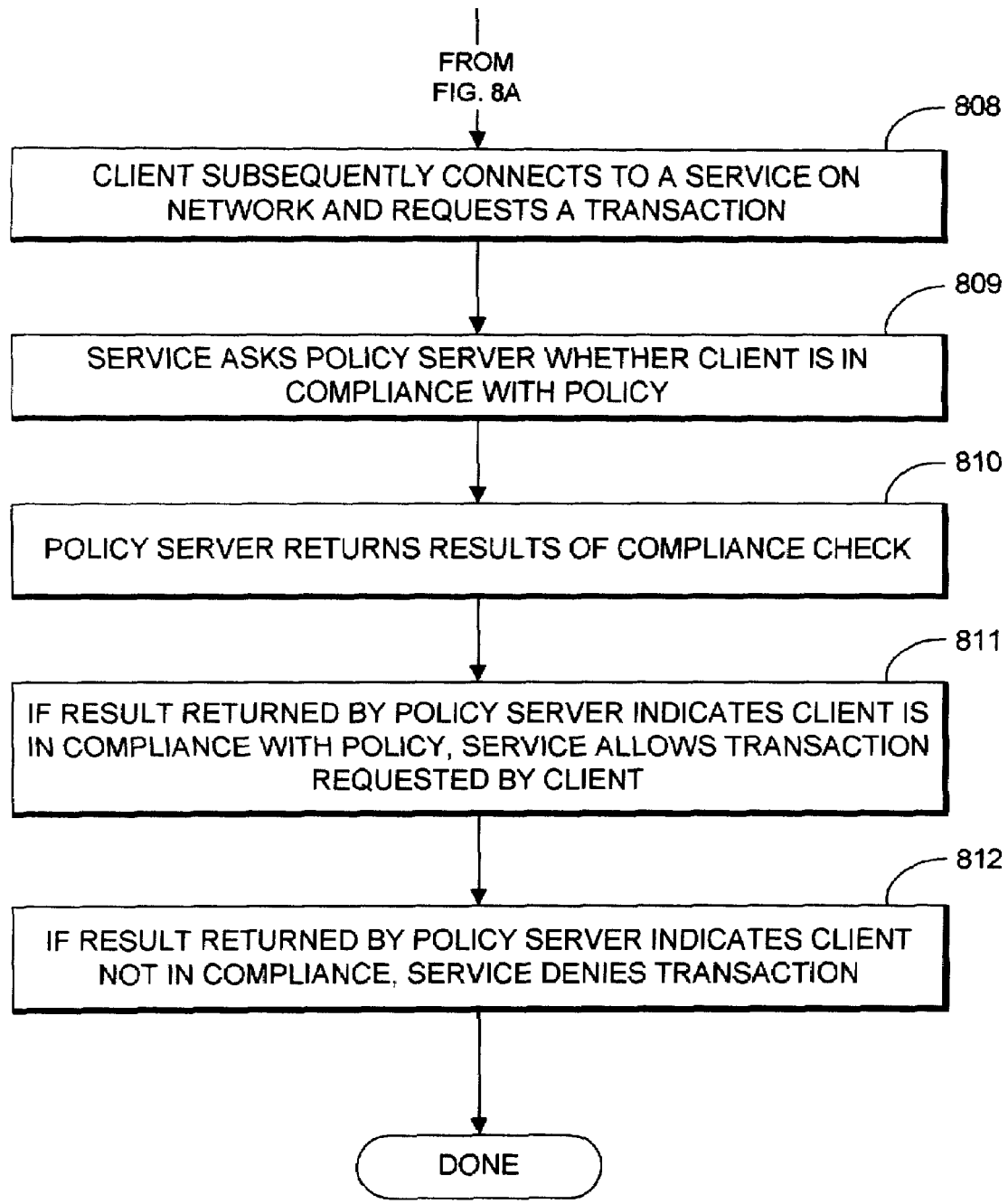

FIGS. 8A-B comprise a single flowchart 800 illustrating the process of authenticating a client attempting to access an application or service (e.g., on an application server) through a separate security evaluation service. As with the prior flowcharts, the following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

At step 801 a client (e.g., a personal computer) connects to a network to attempt to gain access to a service available on the network. At step 802 the client receives the network address of an authentication server. The client logs in to the authentication server and provides required credentials (e.g., user name and password or other credentials) at step 803. If the client is authenticated, a security evaluation service (e.g., policy server) is then invoked to determine the client's compliance with a policy required for access to services and resources. At step 804 the policy server issues a communication (e.g., policy challenge) to the client requesting information from the client about its state.

In response to the challenge from the policy server, the client collects and sends the requested information to the policy server at step 805. The information received by the policy server may, for example, include the policy MD5 of the policy on the client device and/or other relevant information required to determine the client's compliance status. Based on the information received from the client, at step 806 the policy server determines whether or not the client is in compliance with the required policy. It should be noted that the client may alternatively perform the evaluation itself and send the results of the compliance check to the policy server as previously described. At step 807, the policy server retains and/or stores the result of the compliance evaluation.

The client subsequently connects to a service available on the network and requests a transaction at step 808. In response, at step 809 the service communicates with the policy server (e.g., sends a message to the policy server) asking the policy server whether or not the client is in compliance with the policy. At step 810 the policy server returns the result of the compliance check of the client indicating whether or not the client is in compliance with the policy. If the response (i.e., result of compliance check) received from the policy server indicates that the client is in compliance, then at step 811 the service allows the transaction requested by the client. However, if the result returned by the policy server indicates that the client is not in compliance with the policy, at step 812 the service denies the transaction.

As yet another alternative example, the server providing the service that is requested by the client can be constructed and configured to check some or all of the policy rules that the policy server may otherwise evaluate, thereby removing the need to use an external policy server for policy enforcement. Those skilled in the art will appreciate that a number of other configurations may be used for evaluating and enforcing compliance with a policy. For example, a particular server may handle certain matters while invoking an external policy service in other situations, depending on such factors as the complexity of the decision-making process and the performance impact of consulting an external policy service.

How Compliance is Evaluated

A basic implementation of the compliance evaluation process will now be briefly described. In the presently preferred embodiment, checking the client's system configuration for compliance with a security policy involves several basic steps. These steps generally follow after the user authentication (e.g., user name and password authentication) has been completed.

The server (e.g., the security checker on the server or a separate security evaluation service) initially requests a client configuration report with specified parameters from the client. The list of parameters requested in the report is specified by the required security policy. In response, the client provides the client security checker on the server a client configuration report. The client configuration report describes configuration information about the client, including those parameters requested by the server.

Next, the security checker evaluates the client configuration report for compliance against the required policy. Generally, the security checker determines whether or not the values provided in the client configuration report are within the allowed (or required) range. Based on this evaluation, the security checker on the server generates a compliance report. The compliance report indicates if there are any noteworthy results in the compliance check step. These items can either be parameter requirements which are not satisfied (and therefore indicate an out-of-compliance condition), or they can be parameter requirements which are within an allowed range, but nevertheless should be logged for further examination or to alert the user or administrator. Finally, a compliance result is compiled from the compliance report, which indicates either that the client is "compliant" or "out-of-compliance".

If the client is determined to be "out of compliance" the system should take appropriate action to block or restrict further client access either to the system, or to certain of its services or resources. The above security evaluation process may easily be modified to fit circumstances or performance requirements, as needed. One option, for instance, is for the server to push the compliance requirements to the client and have the client compute the compliance report and compliance status. This frees the server from needing to process the compliance report, which may reduce CPU processing overhead at the server. Those skilled in the art will appreciate that the above evaluation process can be performed at either the client or the server depending on various factors, including which alternative minimizes the amount of data that must be sent back and forth and system responsiveness to changes in security policies.

In fact, in many cases the compliance evaluation is most efficiently performed on the client device, as performing the evaluation at the client can off load processing from the server and reduce the amount of information that must be communicated by the client to the server. For example, the server (or an external policy server) may send a policy or a set of required security attributes to the client. The client can then evaluate compliance with the policy and simply inform the server of the result of the compliance evaluation. This message informing the server of the result can be quite small, thereby preserving bandwidth as well as reducing processing overhead at the server. However, this structure may require a relatively large policy (or set of required security attributes) to be downloaded to, or otherwise available at, the client. This is particularly true if the security policy that is being enforced has a large number of conditions (e.g., required security attributes). A security policy may, for example, include a long list of processes (e.g., with a particular file name or checksum) that should not be running on the client device. It would be inefficient to send a lengthy list of conditions of this nature to the client every time that compliance is to be evaluated. However, given that the security policy is often available at the client device (e.g., as it has previously been downloaded to the client by a separate policy server), the amount of data that must be communicated to the client is minimal in many cases. Also, because the frequency of policy changes is generally low compared to the number of times compliance is evaluated, performing the evaluation at the client typically results in an over-all reduction in the volume of data that must be communicated between the client and the server.

In certain cases, however, it may be more advantageous for the client to send data to the server which the server can then evaluate. For example, the policy enforced by the server may be modified to require an updated anti-virus release (e.g., to require clients to download a new set of virus definitions in response to a virus emergency in which a new virus is spreading rapidly). In this case, it is generally inefficient to require each client device to down-load an entirely new policy just because the anti-virus rule has been updated. Instead, the virus information is provided to the server, enabling the server to determine which clients are (and are not) in compliance with the anti-virus rule of the policy. The server may then take action based on this information. For example, in the case of a virus emergency, the server may "restrict" connected clients that are not in compliance with the anti-virus rule and send them a message informing them that they need to update their anti-virus software and/or definition files. As illustrated by the above examples, the security evaluation may be performed at the client or at the server. Alternatively, security compliance may be evaluated by a separate security evaluation service as previously described.

Example of Client Compliance Evaluation

When the client has received a compliance challenge in the form of a CMP packet, it can read the packet to determine what kind of compliance is required. If compliance only requires the presence of a security client, this can readily be determined by loading a TrueVector engine API library (a loadable library called "vspubapi.dll") and calling an API function to determine if the security client is running. Loading the TrueVector engine API library is accomplished using the standard Windows "LoadLibrary" function. However, the following "CheckCodeSignature" function checks the validity of the API library before loading it:

```
1: BOOL TriggerIntegrityClient::CheckCodeSignature(const
char*
szFileName)
2:   {
3:   int iLen;
4:   int iWLen;
5:   WCHAR* szwTVFile;
6:   WIN_TRUST_ACTDATA_CONTEXT_WITH_SUBJECT trust
Data;
7:   WIN_TRUST_SUBJECT_FILE trustFile;
8:   GUID guidAction = WIN_SPUB_ACTION_PUBLISHED_
SOFTWARE;
9:   GUID guidSubjectPeImage = WIN_TRUST_SUBJTYPE_PE_
IMAGE;
10:    BOOL bResult = FALSE;
11:
12:  if (!hFileWVT)
13:     hFileWVT = Load Library(WVT_FILE_NAME);
14:
15:  if (hFileWVT)
16:   {
17:    if (!pWinVerifyTrust)
18:       pWinVerifyTrust = (PWINVERIFYTRUST)GetProcAddress
(hFileWVT,
WVT_FUNC_NAME);
19:    if (pWinVerifyTrust)
20:     {
21:      // convert file path to widechar* for WinVerifyTrust
( )
22:      iLen = strlen(szFileName);
23:      iWLen = (iLen + 1) * sizeof(WCHAR);
24:      szwTVFile = (WCHAR*)malloc(iWLen);
25:     if (szwTVFile)
26:      {
```

```
-continued
27:     ZeroMemory(szwTVFile, iWLen);
28:     mbstowcs(szwTVFile, szFileName, iLen);
29:
30:         // fill out WinVerifyTrust( ) data structures
31:     trustFile.lpPath = szwTVFile;
32:     trustFile.hFile = INVALID_HANDLE_VALUE;
33:
34:     trustData.hClientToken = NULL;
35:     trustData.SubjectType = &guidSubjectPeImage;
36:     trustData.Subject = &trustFile;
37:
38:         // Call WinVerifyTrust( )
39:     bResult = pWinVerifyTrust((HWND)INVALID_HAN
DLE_VALUE,
&guidAction,
40:                 &trustData) == ERROR_SUCCESS;
41:     free(szwTVFile);
42:     }
43:   }
44: }
45: return bResult;
46: }
```

The above function checks the code signature of a file (e.g., the TrueVector API library file) before the file is loaded. If the function returns "TRUE", then the file is safe to be loaded using the standard Windows "LoadLibrary( )" function.

After the TrueVector engine API file has been validated and loaded, the following "AreYouThere( )" function of the TrueVector API library checks for the presence of the TrueVector engine:

```
1: BOOL TriggerIntegrityClient::AreYouThere( )
2: {
3:    int iSize = iVersionBufferSize;
4:
5:    typedef BOOL (___stdcall *MYPROC)( LPSTR szVersion,
INT* size);
6:    MYPROC pfunc;
7:    if((hTVLibrary !=NULL) &&
8:    ((pfunc = (MYPROC) GetProcAddress(hTVLibrary,"tvIs
TvRunning"))
!=NULL))
9:    {
10:        BOOL retVal = pfunc(szTvVersion, &iSize);
11:        if(iSize > iVersionBufferSize)
12:        {
13:          delete [] szTvVersion;
14:          szTvVersion = new char[iSize];
15:          iVersionBufferSize = iSize;
16:          return pfunc(szTvVersion, &iSize);
17:        }
18:        else
19:          return retVal;
20:    }
21:    else
22:      return FALSE;
23: }
```

The above function checks to determine if the TrueVector engine (the client security software) is running on the client. If compliance only requires the presence of a security client, then this function can determine whether or not the client is in compliance.

A security policy may also provide for additional compliance checking beyond simply detecting the presence of a security client. In this case, the additional security requirements are provided to the client for compliance evaluation at the client. In the presently preferred embodiment, an XML description of the security requirements (attributes) is provided to the client in a CMP packet sent to the client. Although XML is used in the currently preferred embodiment, those skilled in the art will appreciate that other data formats may also be used for describing the attributes to be evaluated. For example, this information could be represented in text strings or in an ASN.1 (Abstract Syntax Notation One) file. To evaluate compliance with these security requirements at the client, the same initial steps described above are required to load the TrueVector engine API library. However, additional steps are required to determine if the client device (e.g., computer) is compliant with the security requirements.

The TrueVector API library provides a "tvGetSecurityProviderInfo" function to obtain information about the current state of the client device, including information about the security client installed on the client device. The function currently returns data in the form of an XML Unicode string which describes the current compliance state of the client as described below. The current state of the client computer is then compared to the requirements that were described in the incoming CMP packet for determining whether the client is in compliance with the security requirements.

The above is one example of a process that may be used for checking security compliance of a client device. Those skilled in the art will recognize that a similar compliance checking process can be implemented using various other security engines, including anti-virus, firewall, and/or spyware checkers. For example, an anti-virus engine can be used for determining if the client was in compliance with required anti-virus rules. As another example, a configuration checker (e.g., HfNetCheckPro from Shavlik Technologies of Roseville, Minn.) can be used to determine if necessary product releases, patches, or other files have been installed or applied at the client device. Accordingly, it should be understood that the above example of compliance checking using the TrueVector engine is only one example of a security engine or module that can be used for performing a compliance evaluation.

How Compliance is Described

In the presently preferred embodiment, compliance checking involves several basic data structures, which represent the data exchanged or evaluated by the system at each of the compliance evaluation steps. Note that while in the system of the present invention these data structures are usually represented as either text strings or XML documents, the same information could be represented in other data formats, as desired. For instance, the data could be represented in ASN.1 format. ASN.1, or Abstract Syntax Notation One, is an International Standards Organization (ISO) data representation format used to achieve interoperability between platforms.

A first data structure in the presently preferred embodiment is a "reporting requirements" data structure. The reporting requirements data structure contains a list of attributes that the client is required to report. A second data structure is a "configuration report" data structure, which lists the values of the required reporting parameters. The configuration report data structure is structured as a list of attributes and their values. The following is a simple example of a member of the configuration report data structure:

```
1: Example:
2: <ConfigurationReport>
3:  <provider type="zonelabs" policyMd5="" policyVersion
="" />
4:  <provider type="symantec.nav" datDate="2003-11-13
00:00:00
−08:00" datVersion="51113w" engineVersion="4.2.0.7"
status="notRunning" />
5: </ConfigurationReport>
```

A third data structure is a "compliance requirements" (or compliance rules) data structure. The compliance rules data structure lists certain required values or ranges to be used for determining whether or not a client is in compliance with a security policy. The following definition illustrates the syntax for the rules in XML:

```
1: <ComplianceRules>
2:   <ComplianceRule operator="eq|lt|gt|between" provider="provider.name"
3:     attribute ="attrib.name" operand1="value1" operand2="value2"
4:     status="status_string" message="user warning message"
     />
5:   </ComplianceRules>
```

Another example is as follows:

```
1: <ComplianceRules>
2:   <ComplianceRule operator="ge" provider="zonelabs" attribute="clientVersion"
3:     operand1="5.4.2" status="status_string" message="user warning
     message" />
4:   <ComplianceRule operator="ge" provider="symantec.nav" attribute="datVersion"
5:     operand1="8.0" status="status_string" message="user warning
     message" />
6:   </ComplianceRules>
```

Another data structure of the currently preferred embodiment is a "compliance report" data structure. The compliance report data structure lists noteworthy items that were found by applying the compliance rules to the client configuration report. Several example entries in the compliance report data structure are illustrated below. The following is an entry indicating that the version of the security software installed on the client is not up to date:

```
1: <ComplianceReport>
2: Compliance Status: ZoneLabs.clientVersion too low
3: Compliance Code: non-compliant
4: User-message: ZA_CLIENTVERSION Your client version is not
up to date
5: </ComplianceReport>
```

The following is another example entry:

```
1: <ComplianceReport>
2: Compliance Status: Symantec.nav.datDate too old
3: Compliance Code: non-compliant
4: User-message: AV_DAT_FILE_OUT_OF_DATE Your Antivirus version
must be updated
5: </ComplianceReport>
```

The above entry indicates that the virus definition file (e.g., .dat file) in use at the client is out of date.

Another example entry is as follows:

```
1: <ComplianceReport>
2: Compliance Status: ZoneLabs.clientVersion update available
3: Compliance Code: Compliant
4: User-message: ZA_CLIENTUPGRADE An update is available
for
your client
5: </ComplianceReport>
```

This entry indicates that although the client is compliant, the client is not using the most current version of the client security module and may wish to install an available update.

In the currently preferred embodiment, the compliance result is an enumerated type with one of two values. A value of "compliant" indicates that the client is in compliance with required elements of the security policy. A value of "non-compliant" indicates that the client is not in compliance with the policy. In one embodiment, the result of a compliance check will be equal to "non-compliant" if any line item in the compliance report is marked as "non-compliant".

Currently, if the compliance check is performed at the client device, the compliance result is communicated from the client back to the compliance checker as a response message from the client to the security checker module of the system. In the response message, the value of "compliant" is encoded as the value zero (0), and the value of "non-compliant" is encoded as a non-zero value. If the client device sends a response message indicating that it is "non-compliant", the security checker program will generally exit and return a non-zero value (e.g., the value one (1)) to its caller (for example, the sub-authentication filter DLL). If the client device replies that it is "compliant", the security checker module will usually exit and return a zero value to its caller. As previously described, the compliance check may be performed at the client or at the server, or compliance may be evaluated by a separate security evaluation service.

While the invention is described in some detail with specific reference to a single-preferred embodiment and certain alternatives, there is no intent to limit the invention to that particular embodiment or those specific alternatives. Although the above discussion uses an example of checking security attributes of a client for compliance with a security policy, the present invention may also be used to verify a number of other attributes of the client device that may be of interest. For instance, the system and methodology of the present invention may also check to ensure that required virus suppression measures or file integrity mechanisms are in force on a client device. Accordingly, those skilled in the art will appreciate that modifications may be made to the preferred embodiment without departing from the teachings of the present invention.

What is claimed is:

1. A method employing supplemental authentication to prevent an inadequately secured client from compromising a host that offers a service that the client wishes to access, the method comprising:

specifying a supplemental authentication policy to be enforced upon the client's request to access the service, the policy establishing firewall and anti-virus measures required to be installed and operational at the client in order for the client to be considered adequately secured for accessing the service;

receiving a request for access to the service from the client;

attempting primary authentication of the client based on credentials presented by the client;

if the client passes primary authentication, attempting secondary authentication by testing the client's current firewall and anti-virus measures against said policy to confirm that the client is adequately secured for accessing the service; and if the client fails to pass both primary and secondary authentications, denying the client access to the service.

2. The method of claim 1, wherein the service comprises a remote service accessible by the client through a network.

3. The method of claim 1, further comprising:
restricting access to the service if the client is determined to be non-compliant with said policy.

4. The method of claim 3, wherein restricting access includes assigning limited access privileges to the client.

5. The method of claim 3, wherein restricting access includes issuing a Kerberos ticket specifying limited access privileges if the client is determined to be non-compliant with the policy.

6. The method of claim 1, wherein said policy comprises a security policy.

7. The method of claim 6, wherein said security policy includes security measures required on the client.

8. The method of claim 1, wherein said policy includes anti-spyware measures required on the client.

9. The method of claim 1, wherein said step of providing access includes issuing a Kerberos ticket specifying access privileges provided to the client.

10. The method of claim 1, wherein the policy further specifies that a selected one of a file integrity policy be in effect at the client, a file be installed at the client, a process be running at the client, a particular checksum value exist at the client, and a particular registry entry exist at the client.

11. The method of claim 1, wherein said receiving step includes receiving a request for access to a server by a remote client.

12. The method of claim 1, wherein said receiving step includes receiving a request for access to a service on a computer system by another process on the computer system.

13. The method of claim 1, wherein said attempting primary authentication step includes authentication based on user identity.

14. The method of claim 1, wherein said attempting primary authentication step includes using a selected one of Kerberos authentication, Pluggable Authentication Module (PAM) authentication, Extensible Authentication Protocol (EAP) authentication, Generic Security Service API (GSS-API) authentication, and trust negotiation in TLS (TNT) authentication.

15. The method of claim 1, wherein said credentials include a selected one of a user name, a password, and a certificate.

16. The method of claim 1, wherein said attempting secondary authentication step includes obtaining firewall and anti-virus information from the client.

17. The method of claim 16, wherein said step of obtaining firewall and anti-virus information from the client includes requesting firewall and anti-virus information collected by a client-side component.

18. The method of claim 1, wherein said attempting secondary authentication step includes substeps of:
providing a copy of the policy to the client; and
performing a compliance check at the client to determine compliance with the policy.

19. The method of claim 1, wherein said attempting secondary authentication step includes obtaining information from a security evaluation service that has previously evaluated compliance by the client with the policy.

20. A computer-readable storage medium having processor-executable instructions for performing the method of claim 1.

21. A downloadable set of processor-executable instructions for performing the method of claim 1.

22. A system providing supplemental authentication to prevent an inadequately secured client device from compromising a host that offers access to a service, the system comprising:
a supplemental authentication policy specifying access privileges to be assigned to a client device based on security-related attributes of the client device that are relevant to the client device's access of the service, said policy establishing firewall and anti-virus measures required to be installed and operational at the client device in order for the client device to be considered adequately secured to access the service;
a primary authentication module for receiving a request from a given client device for access to the service and determining whether to authenticate the given client device for access to the service, wherein the given client device is denied access to the service if the primary authentication module cannot authenticate the device; and
a supplemental authentication module for examining current security-related attributes of the given client device authenticated by said primary authentication module and determining whether to authenticate the given client device by testing whether the given client device's current firewall and anti-virus measures satisfy said policy, wherein the given client device is denied access to the service if the supplemental authentication module cannot authenticate the device.

23. The system of claim 22, wherein said policy comprises a security policy.

24. The system of claim 22, wherein said policy includes security attributes of the client device.

25. The system of claim 22, wherein said supplemental authentication module determines whether specified anti-virus measures are in effect on the client device.

26. The system of claim 22, wherein said supplemental authentication module examines a selected one of a file integrity policy in effect at the client device, a file installed at the client device, a process running at the client device, a particular checksum value at the client device, and a registry entry at the client device.

27. The system of claim 22, wherein said primary authentication module uses a selected one of Kerberos authentication, Pluggable Authentication Module (PAM) authentication, Extensible Authentication Protocol (LAP) authentication, Generic Security Service API (GSS-API) authentication, and trust negotiation in TLS (TNT) authentication.

28. The system of claim 22, wherein said primary authentication module authenticates the client device based upon user identity.

29. The system of claim 28, wherein the client device provides a user name and password to said primary authentication module for authenticating user identity.

30. The system of claim 28, wherein the client device provides a digital certificate to said primary authentication module for authenticating user identity.

31. The system of claim 22, wherein the supplemental authentication module includes a component on the client device for collecting information about firewall and anti-virus measures.

32. The system of claim 31, wherein the component on the client device evaluates the collected information about firewall and anti-virus measures at the client device for determining compliance of the client device with the policy.

33. The system of claim 32, further comprising:
a policy server for providing the policy to the client device.

34. The system of claim 22, wherein the supplemental authentication module receives information about firewall and anti-virus measures of the client device from the client device.

35. The system of claim 34, wherein the client device provides information about firewall and anti-virus measures to the supplemental authentication module in response to a message from the supplemental authentication module.

36. The system of claim 35, wherein said information about firewall and anti-virus measures is provided as a selected one of a text string, an Extensible Markup Language (XML) document, and an Abstract Syntax Notation One (ASN. 1) file.

37. The system of claim 22, wherein the supplemental authentication module permits access to the service if the client device is in compliance with the policy.

38. The system of claim 22, wherein the supplemental authentication module issues a Kerberos ticket specifying the client device's access privileges.

39. The system of claim 22, wherein the supplemental authentication module restricts access to the service if the client device is non-compliant with the policy.

40. The system of claim 22, further comprising:
a policy server in communication with the supplemental authentication module for evaluating compliance by the client device with the policy based upon attributes of the client device.

41. The system of claim 22, wherein the supplemental authentication module comprises a selected one of an anti-virus engine, a configuration checker, and a security engine.

42. A method providing supplemental authentication to prevent an inadequately secured client from compromising a host that offers a service that the client wishes to access, the method comprising:
specifying a supplemental authentication access policy for assigning privileges to a client to use the service based on security attributes of the client, the policy establishing firewall and anti-virus measures required to be installed and operational at the client in order for the client to be considered adequately secured for accessing the service;
receiving a request for use of the service from a client;
attempting primary authentication of the client based on user identity information provided by the client;
if the client is authenticated based on user identity, attempting supplemental authentication by testing whether the client's current firewall and anti-virus measures satisfy said policy; and
assigning privileges to the client to use the service based on whether the client's firewall and anti-virus measures satisfy said policy, so that the client is denied access to the service if insufficient privileges are assigned.

43. The method of claim 42, wherein said step of assigning privileges includes blocking access to the service if the client is determined to be non-compliant with the access policy.

44. The method of claim 42, wherein said step of assigning privileges includes restricting access to the service if the client is determined to be non-compliant with the access policy.

45. The method of claim 42, wherein set step of assigning privileges includes issuing a Kerberos ticket to the client.

46. The method of claim 42, wherein said access policy includes security measures required on the client.

47. The method of claim 42, wherein said access policy includes anti-spyware measures required on the client.

48. The method of claim 42, wherein said access policy includes an attribute required for the client.

49. The method of claim 48, wherein said attribute includes a selected one of a file integrity policy in effect at the client, a file installed at the client, a process running at the client, a particular checksum value at the client, and a registry entry at the client.

50. The method of claim 42, wherein said receiving step includes receiving a request for access to a server by a remote client.

51. The method of claim 42, wherein said attempting supplemental authentication step includes requesting attribute information from the client.

52. The method of claim 51, wherein the attribute information is provided as a selected one of a text string, an Extensible Markup Language (XML) document, and an Abstract Syntax Notation One (ASN. 1) file.

53. The method of claim 42, wherein said attempting supplemental authentication step includes using a client-side component for collecting attribute information.

54. The method of claim 53, wherein said client-side component determines whether the client is in compliance with the access policy based on the collected attribute information.

55. The method of claim 53, wherein said client-side component sends the collected attribute information to a policy server for determining whether the client is in compliance with the access policy.

56. A computer-readable storage medium having processor-executable instructions for performing the method of claim 42.

57. A downloadable set of processor-executable instructions for performing the method of claim 42.

58. In a system comprising a client computer connecting to a service through a network, a method for regulating access to the service based on a specified supplemental authentication access policy, the policy including requirements about firewall and anti-virus measures that the client computer must meet before the client computer is provided access to the service, the method comprising:
after initial authentication of the client computer has occurred, attempting supplemental authentication of the client computer by transmitting a challenge from the service to the client computer connecting to the service to determine whether the client computer's current firewall and anti-virus measures satisfy the requirements of said policy;
transmitting a response from the client computer back to the service, for responding to the challenge issued by the service that is attempting supplemental authentication of the client computer; and
based on the response received from the client computer, blocking access to the service by the client computer if the client computer's current firewall and anti-virus measures fail to satisfy the requirements of said policy.

59. The method of claim 58, wherein said access policy includes rules that are enforced against selected ones of users, computers, and groups thereof 60. The method of claim 58, wherein said challenge includes at least some rules of said access policy that are transmitted to the client computer.

61. The method of claim 58, wherein said access policy is provided at the client computer.

62. The method of claim 61, wherein the client computer performs a compliance check for determining compliance with the access policy and returns the compliance check result in response to the challenge.

63. The method of claim 58, wherein said policy further specifies that a selected one of a file integrity policy be in effect at the client computer, a file be installed at the client computer, a process be running at the client computer, a particular checksum value exist at the client computer, and a particular registry entry exist at the client computer.

64. The method of claim 58, further comprising:
otherwise, permitting access to the service by the client computer.

65. The method of claim 64, wherein permitting the client computer to access the service includes assigning access privileges based on the response received from the client computer.

66. The method of claim 65, wherein assigning access privileges includes issuing a Kerberos ticket for providing said access privileges to the client computer.

67. A downloadable set of processor-executable instructions for performing the method of claim 58.

68. A computer-readable storage medium having processor-executable instructions for performing the method of claim 58.

* * * * *